(12) United States Patent
Mylet

(10) Patent No.: US 8,954,187 B1
(45) Date of Patent: Feb. 10, 2015

(54) SOCIAL NETWORK AND SAFETY FEATURES FOR PROCESS CONTROL SYSTEMS

(75) Inventor: Neil T. Mylet, Camden, IN (US)

(73) Assignee: Loadout Technologies LLC, Camden, IN (US)

( * ) Notice: Subject to any disclaimer, the term of this patent is extended or adjusted under 35 U.S.C. 154(b) by 842 days.

(21) Appl. No.: 13/030,869

(22) Filed: Feb. 18, 2011

Related U.S. Application Data

(63) Continuation-in-part of application No. 12/543,175, filed on Aug. 18, 2009.

(60) Provisional application No. 61/089,699, filed on Aug. 18, 2008.

(51) Int. Cl.
*G06F 7/00* (2006.01)

(52) U.S. Cl.
USPC .............................. 700/214; 340/5.8; 209/629

(58) Field of Classification Search
USPC ........................................................ 700/214
See application file for complete search history.

(56) References Cited

U.S. PATENT DOCUMENTS

| | | | |
|---|---|---|---|
| 4,072,929 | A | 2/1978 | Garmong |
| 6,061,603 | A | 5/2000 | Papadopoulos et al. |
| 6,097,425 | A | 8/2000 | Behnke et al. |
| 6,484,061 | B2 | 11/2002 | Papadopoulos et al. |
| 6,549,130 | B1 | 4/2003 | Joao |
| 6,965,802 | B2 | 11/2005 | Sexton |
| 7,058,693 | B1 | 6/2006 | Baker, Jr. |
| 2001/0038328 | A1 | 11/2001 | King et al. |
| 2003/0007665 | A1 | 1/2003 | Ponsot et al. |

(Continued)

FOREIGN PATENT DOCUMENTS

JP 55084725 6/1980

OTHER PUBLICATIONS

Adrienne Lutovsky, Press Release, Oct. 2010, pp. 1-3, Bakersfield, CA.

(Continued)

*Primary Examiner* — Gene Crawford
*Assistant Examiner* — Kyle Logan
(74) *Attorney, Agent, or Firm* — SmithAmundsen LLC; Dennis S. Schell

(57) ABSTRACT

A system for improving process awareness, safety, security, efficiency, and other aspects of industrial and non-industrial processes for participants associated with the processes. The system includes a control device associated with the process, and for each participant, a mobile client device and participant profile. The system improves safety, security, and efficiency by the control device enabling remote monitoring of participants and the process, implementing participant profile limitations, and authorizing participants to remotely monitor and control aspects of the process. The control device incorporates social network features to validate compliance and/or consent of all designated participants in order for control aspects of the process to be enabled. A participant's use of the mobile client device to collect, distribute, view, and interact with data and the process, including visual/video feeds of the process and/or participants, enables real-time interaction with the process and participants regardless of physical proximity of the participant to the process or other participants. The mobile client devices include a GUI for displaying visual feeds and participant interacting with the control device, process, participant profile, and other participants.

21 Claims, 16 Drawing Sheets

(56) References Cited

U.S. PATENT DOCUMENTS

| | | |
|---|---|---|
| 2003/0141165 A1 | 7/2003 | Reznik et al. |
| 2003/0174207 A1* | 9/2003 | Alexia et al. .................... 348/89 |
| 2005/0199470 A1 | 9/2005 | Buchi |
| 2006/0080442 A1 | 4/2006 | Ferguson et al. |
| 2006/0150602 A1 | 7/2006 | Stimmann |
| 2006/0251502 A1 | 11/2006 | Scharfenberger |
| 2007/0103271 A1 | 5/2007 | King et al. |
| 2007/0108109 A1* | 5/2007 | Erlandsson-Warvelin et al. ............................. 209/629 |
| 2008/0133046 A1 | 6/2008 | Tourdot et al. |
| 2009/0099775 A1* | 4/2009 | Mott et al. ................... 701/300 |
| 2009/0143923 A1 | 6/2009 | Breed |
| 2010/0042248 A1 | 2/2010 | Mylet |
| 2010/0127824 A1* | 5/2010 | Moschl et al. ............... 340/5.65 |
| 2012/0062360 A1* | 3/2012 | Wendt ........................... 340/5.8 |

OTHER PUBLICATIONS

Prosoft Technology, User Manual, Feb. 8, 2011, pp. 1-76, Bakersfield, CA.

Bateman Engineering, Diagram; http://www.batemanengineering.com/images/loadoutDiagram.jpg.

Bateman Engineering, Rapid Load-Out Stations, http://www.batemanengineering.com/BETRapidLoad-OutStations.htm, Mar. 26, 2009.

* cited by examiner

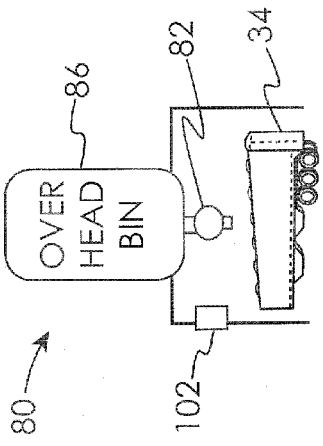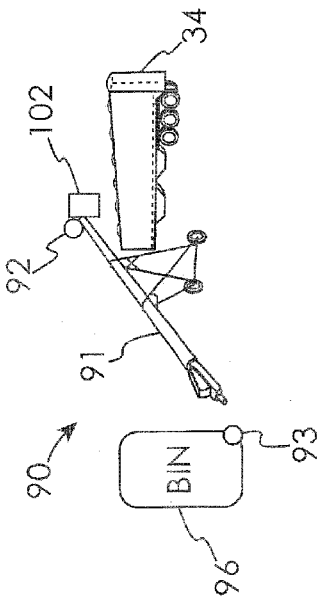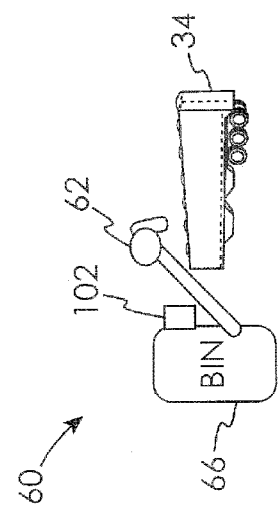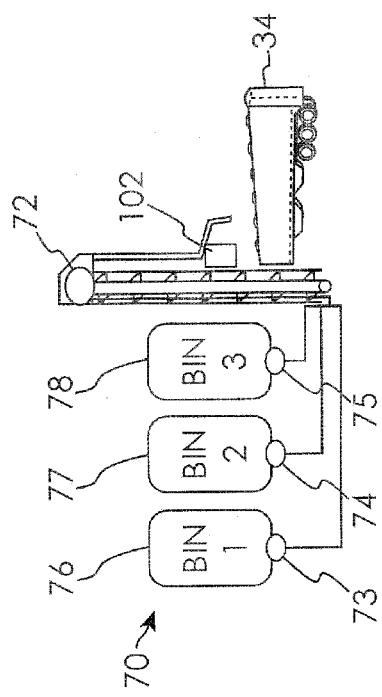

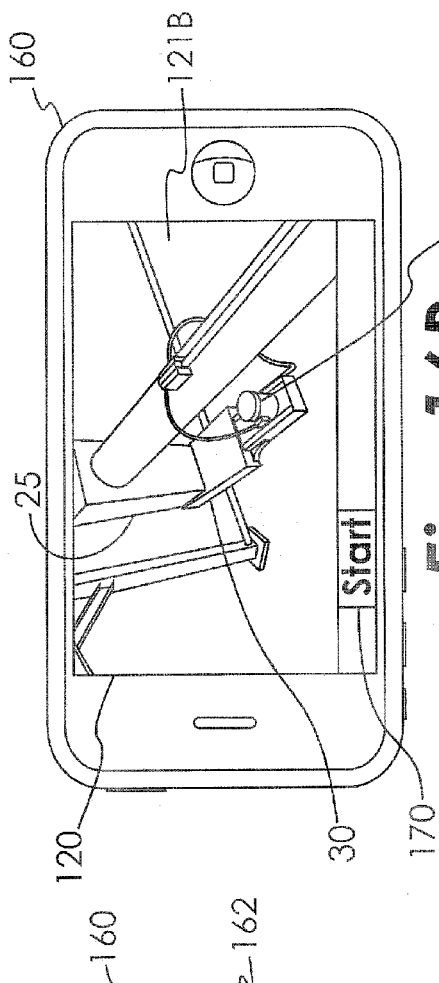
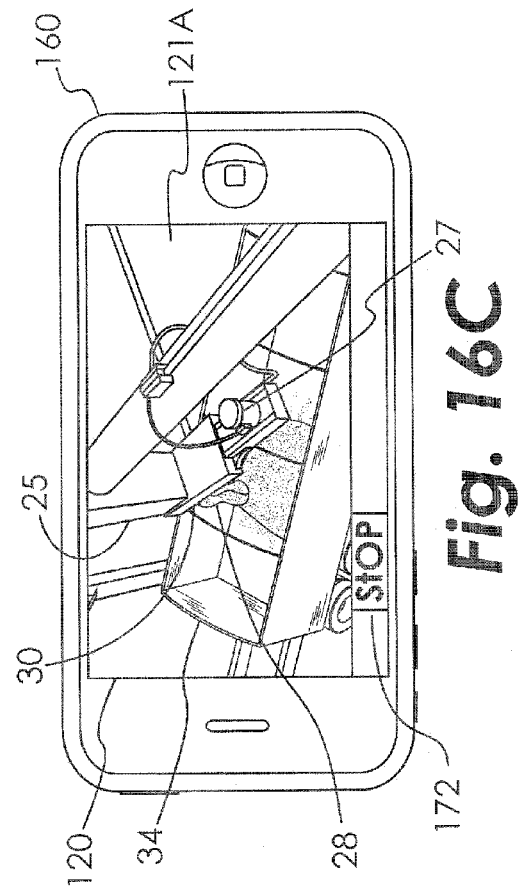
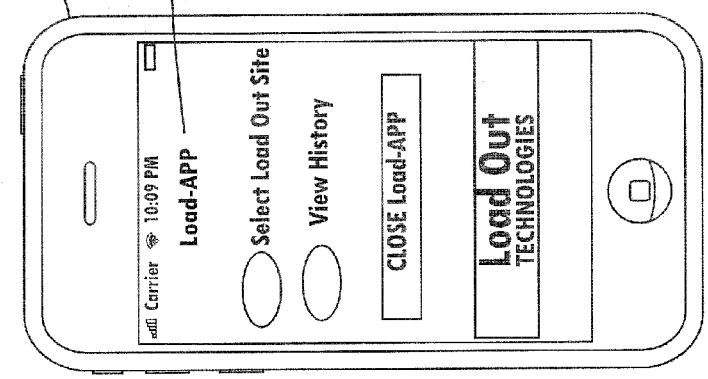
Fig. 16A
Fig. 16B
Fig. 16C

SOCIAL NETWORK AND SAFETY FEATURES FOR PROCESS CONTROL SYSTEMS

CROSS-REFERENCE TO RELATED APPLICATIONS

This application is a continuation-in-part of U.S. Nonprovisional patent application Ser. No. 12/543,175, filed Aug. 18, 2009, and titled MONITORING AND CONTROL SYSTEM FOR COMMODITY LOADING, which claims the benefit of U.S. Provisional Application No. 61/089,699, filed Aug. 18, 2008, which are herein entirely incorporated by reference.

BACKGROUND

The present disclosure relates to process control systems, and more specifically, to monitoring and control of tangible processes and monitoring of process participants using mobile wireless client devices.

Prior systems for controlling industrial processes generally include actuators, radiating elements, sensors, or other mechanical, electrical, or chemical devices and instrumentation, at least some of which are operated by a type of logic device, generally referred to as process controllers, that monitor and control aspects of an industrial process. The process controllers that initiates and terminates a process may be implemented by simple on-off switches or other such controls. However, other process controllers may monitor and/or control various other aspects of a process, and may require continuous or periodic monitoring and intervention by an operator to ensure the process has the desired outcome.

Specific to commodities, the transfer and/or loading and unloading process can be burdensome and hazardous to the operator, creating issues of health and safety. With such industrial processes, for example, loading a transport vehicle from an overhead bin that uses a simple control gate and gravity for moving commodity into the transport bin, it is feasible to load a complete vehicle in just over one minute. In order to safely operate such systems, two operators are sometimes required. One operator turns the commodity bin gate on and off to regulate flow, and another operator periodically repositions the vehicle as various sections of the transport bin become full. Such labor costs and inefficiencies of requiring two operators are often not acceptable in industry. Dust and noise from the commodity loading can further complicate the loading task and increase risk. Additionally, inclement weather, such as snow or rain, combined with extended loading time required if using only one operator can degrade the quality of the commodity being loaded.

Therefore, there is a need to provide for safer, more effective monitoring and control of industrial processes and individuals associated with those processes.

SUMMARY

The present invention may comprise one or more of the following features and combinations thereof.

The system provides improved safety, security, efficiency, and other improved aspects of industrial and non-industrial, tangible processes and for participants associated with the processes. The system includes a control device associated with the process, and for each participant, a client device and participant profile, the client device may be a mobile device, for example a handheld device, or a non-mobile device. The system improves safety, security, and efficiency at least in part by the control device enabling remote monitoring of participants and aspects of the process, implementing participant profile and process limitations, and requiring authorization for participants to remotely monitor and control aspects of the process.

The control device incorporates social network features to validate compliance and/or consent of all designated participants in order for control aspects of the process to be enabled. A participant's use of the mobile client device to collect, distribute, view, and interact with data and the process, including visual/video feeds of the process and/or participants, enables real-time interaction with the process and participants regardless of physical proximity of the participant to the process or other participants, unless proximity limits are specified. The mobile client devices include a GUI for displaying visual feeds and participant interacting with the control device, process, participant profile, and other participants.

The system can be utilized with any tangible process, many of which expose participants to harsh environments and other hazards. Such tangible processes included, but are not limited to industrial processes such as mining, drilling, and other raw material collection, bulk material or chemical forming, refining, processing, handling, storing, and transport, comminution, water and waste management, power production and distribution, manufacturing, agriculture, environmental and other processes whether industrial or nonindustrial.

Specific to materials and commodities, processes may include those involving, for example, grain, coal, limestone, organic waste, potash, iron ore, scrap steel, borax, paper and other wood or fiber products, concrete, asphalt, DDG's, oil shale, phosphate, ag coke, fertilizer, soda ash, plastics, trash, mulch, minerals, fluids, and gases.

One illustrative embodiment of a system for monitoring and controlling a tangible process and monitoring and authorizing participants associated with the process includes at least one communication network; a control device coupled to the at least one communications network and adapted to selectively interact with a first process controller associated with a first process, the first process including process control elements and process sensor elements, the selective interaction including the control device receiving data from the sensor elements and actuating the control elements; a first client device that is mobile, coupled to the at least one communications network, and having an application and a GUI enabling a first participant to selectively interact with the first process through the first control device; a first participant profile associated with the first participant, including a plurality of first limitations regarding the first participant's interaction with the first process; and at least one of the application of the first mobile client device and the control device limiting the selective interaction of the first participant with the first process based on the plurality of first limitations.

The application and GUI of the first mobile client device can be adapted to display data received from the sensor elements for viewing by the first participant. The selective interaction of the control device with the first process controller can include initiating, modifying, and terminating the process. The control device can be capable of receiving data from and controlling the process via the selective interaction with the process controller.

The control device can be further adapted to selectively interact with a second process controller associated with a second process, the second process including process control elements and process sensor elements, the selective interaction including the control device receiving data from the sensor elements and actuating the control elements of the second process; the application and a GUI of the first client device enabling the first participant to selectively interact with the second process through the first control device; the plurality of first limitations associated with the first participant profile further including limitations regarding the first participant's interaction with the second process; and at least one of the application of the first mobile client device and the control device limiting the selective interaction of the first participant with the second process based on the plurality of first limitations.

The system can further comprising a second client device coupled to the at least one communications network, and having an application and a GUI enabling a second participant to selectively interact with the first process through the first control device; a second participant profile associated with the second participant, including a plurality of second limitations regarding the second participant's interaction with the first process and the first participant; and at least one of the application of the second client device and the control device limiting the selective interaction of the second participant with the first process and the first participant based on the plurality of first limitation and the plurality of second limitations.

The plurality of second limitations can define the second participant as a supervisor of the first participant's interaction with the first process thereby requiring the second participants consent for the first participant to selectively interact with the first process. Alternatively, the plurality of second limitations can define the second participant as a peer of the first participants interaction with the first process thereby requiring mutual consent of the first and second participants for at least some of the first and second participants selective interaction with the first process.

The at least one communication link can include a wireless communications link. The first process sensor elements can include an imaging device capable of providing a visual feed of at least a portion of the first process; and the application and GUI of the first mobile client device can be adapted to display the visual feed for viewing by the first participant. The control device can require authentication of the identity of the first participant before providing the selective interaction with the first process.

The system can further include a first process profile associated with the first process, including a plurality of process limitations, the control system adapted to modify the selective interaction with the first process controller based on the data received from the sensor elements and the plurality of process limitations. The plurality of process limitations can include a predetermined location relative to the first process; and one of the application of the first mobile client device and the control device can limit the selective interaction of the first participant with the first process based on the outcome of a verification of the first participant proximity to the predetermined location. The verification can be provided by comparing the GPS location of the first mobile client device with the first predetermined location. Alternatively or additionally, the verification is provided by display of a verification code in the vicinity of the first predetermined location, the transmission of the verification code to the control device using the first mobile client device, and validation of the verification code by the control device. The process limitations can include a preset period of time and the control device can include a lost communication timer adapted to modify the process upon the absence of a predetermined communication from the first mobile client device for greater than a preset period of time.

The system can further include at least one health sensor associated with the first participant and providing health data to the first mobile client device; and the first participant profile can include a heath profile and the plurality of first participant limitations can includes a plurality of health limitations; and one of the application of the first mobile client device or the control system can be adapted to modify the selective interaction of the participant with the first process controller based on a comparison of the health data and the plurality of health limitations.

The system can further include at least one environmental sensor providing environmental data to at least one of the first mobile client device and the control device; and at least one of the first participant profile and a first process profile can include an environmental profile having a plurality of environmental limitations; and one of the application of the first mobile client device or the control system can be adapted to modify the selective interaction of the participant with the first process controller based on a comparison of the environmental data and the plurality of environmental limitations.

The system can further include a logistics module associated with the control device and adapted to log logistics data; a logistics profile having a plurality of logistics limitations; and at least one of the application of the first mobile client device and the logistics module can be adapted to modify the selective interaction of the participant with the first process controller based on a comparison of the logistics data and the plurality of logistics limitations.

The system can further include a third participant; a transactional module associated with the control device and adapted to log transactional data; a transactional profile having a plurality of transactional limitations; and at least one of the application of the first mobile client device and the transactional module can be adapted to initiate transactions with the third participant based on a comparison of the transactional data and transactional limitations.

The system can further include a regulatory participant; a regulatory module associated with the control device and adapted to log regulatory data; a regulatory profile having a plurality of regulatory limitations; and at least one of the application of the first mobile client device and the regulatory module can be adapted to modify the selective interaction of the participant with the first process controller based on a comparison of the regulatory data and the plurality of regulatory limitations.

Additional features of the disclosure will become apparent to those skilled in the art upon consideration of the following detailed description of the illustrative embodiment.

BRIEF DESCRIPTION OF THE DRAWINGS

The detailed description particularly refers to the accompanying figures in which:

FIGS. 15A-15D illustrates some other illustrative combinations of commodity storage and industrial process adapted with the illustrative monitoring and control system of FIGS. 9 and 10; and FIG. 16A-16C illustrate a handheld mobile device adapted to provide the remote mobile client device portion of the monitoring and control system of FIGS. 9-12 and 12.

DESCRIPTION OF THE ILLUSTRATIVE EMBODIMENTS

Figure 1:
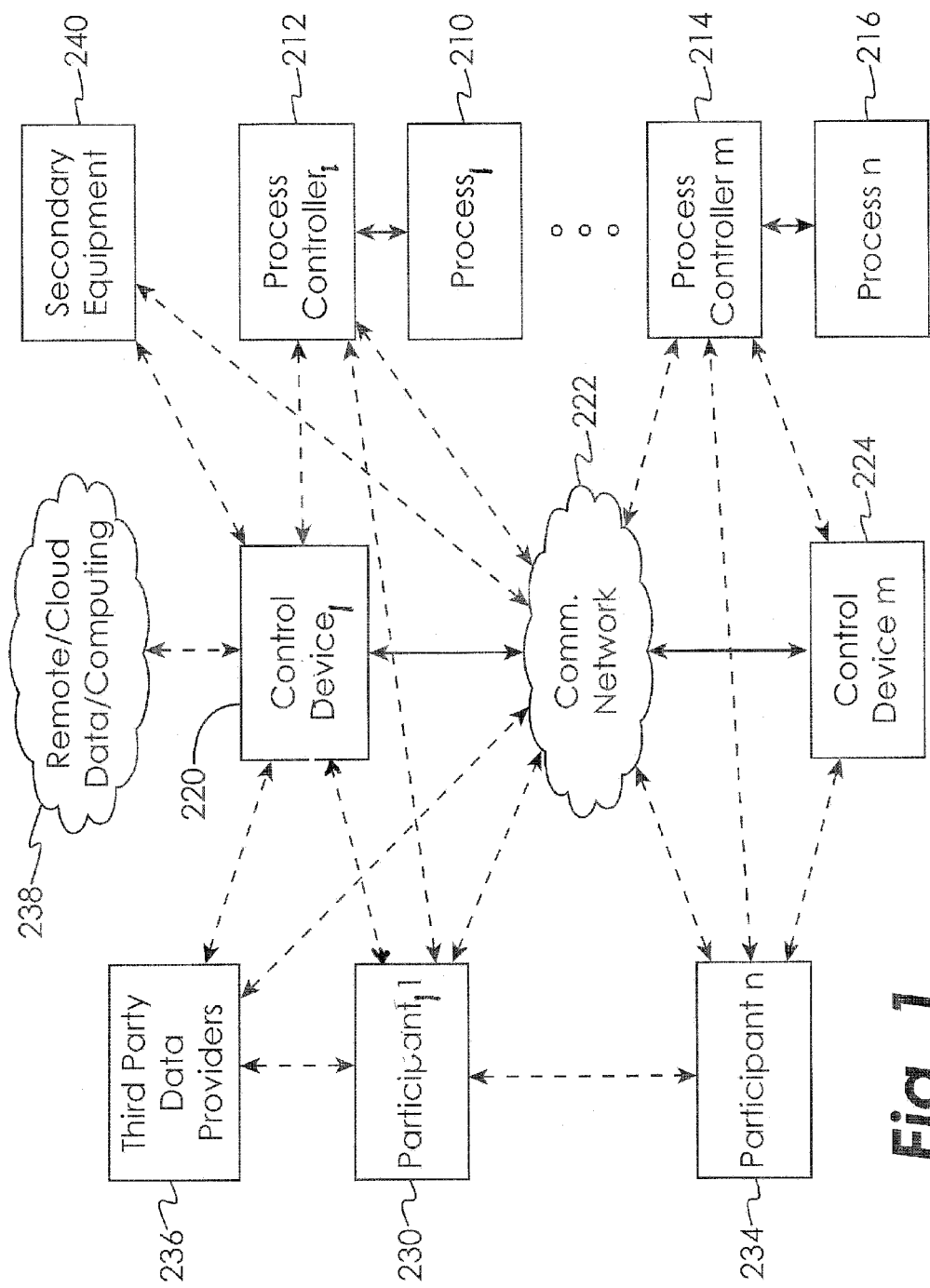
FIG. 1 is an overview schematic block diagram of a system for monitoring and controlling tangible processes and monitoring and authorizing participants associated with the processes

For the purposes of promoting and understanding the principals of the invention, reference will now be made to one or more illustrative embodiments illustrated in the drawings and specific language will be used to describe the same.

Figure 11:
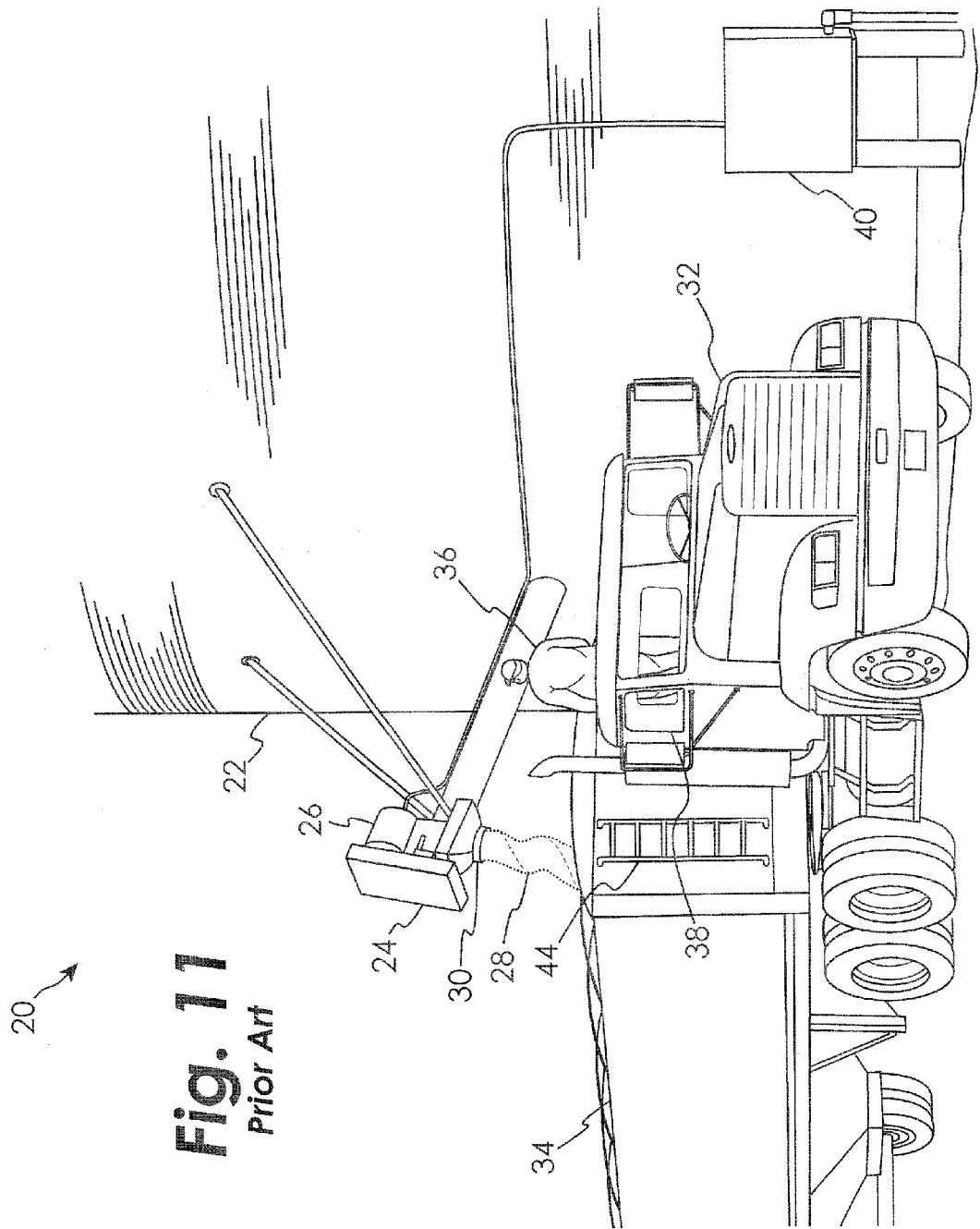
FIG. 11 illustrates a typical prior art storage and industrial process in use.

Referring to FIG. 11, a typical prior art process and participant is illustrated, in this case a participant, operator 36, and a commodity storage and loading facility 20, including a storage bin 22, a process 24, a process controller 26 for controlling flow of the commodity 28, and a commodity outlet 30. The commodity outlet 28 is typically located over an open area in which a transport vehicle 32 having a transport bin 34 can be located for a filling the transport bin 34 with the commodity 28. The process 24 typically includes an existing control box 40 having components such as a power system and motor and/or gate controllers such as a starter, relay switch, or a PLC. The operator 36 must typically activate the flow of commodity by leaving the vehicle cab 38 and turning the process 24 on at control box 40, thereby controlling the movement of process controller 26 for opening/closing a gate, or turning on/off an auger or belt, or other known components of a process 24.

The operator 36 must also typically monitor the loading of the commodity 28 into the transfer bin 34 to ensure all sections of the transport bin are filled to the desired capacity. To ensure proper loading and desired fill, the operator 36 typically climbs a grain bin ladder (not shown) or a vehicle ladder 44, requiring the operator to leave the vehicle cab 38 and the control box 40. However, as a section of the transport bin 34 fills near capacity with commodity 28, the operator must then return to the vehicle cab 38 to reposition the vehicle 32 so that the outlet 30 is then located over a section of the transport bin 34 that has additional capacity remaining. Inconveniently, in order to fill to capacity typical lengthy transport bins 34, this process of the operator 36 leaving the cab 38, climbing the ladder 44, and returning to the cab 38 to reposition the vehicle 32 and transport bin 34 must be repeated multiple times, risking injury, exposure to dust and other allergens, and, for high speed process 24, risking overflow of the commodity 38 from the transport bin 34. Although some prior art facilities 20 include an outlet 30 which is capable of being translated along the length of transport bin 34, thus reducing or eliminating the need to reposition vehicle 32, such system still require the operator 36 to leave the cab 38 to monitor the filling of transport bin 34 and to control the positioning of the outlet 30.

An illustrative embodiment of a system 200 for improving the safety, security, efficiency, and other aspects of such a process and participants associated with the process is illustrated beginning with FIG. 1. A first process 210 includes a first process controller 212, which may include, for example but is not limited to, an industrial control system (ICS), a supervisory control and data acquisition system (SCADA), a distributed control system (DCS), and/or a safety instrumented system (SIS). The process controller 212 is further understood to include electrical or mechanical control or monitoring devices, including, for example, computers, PLCs, relays, and other automated or manual switching devices. The process controller 212 may be pre-existing with the process 210, or may be in part or in whole an add-on device for interfacing the system 200 with control and monitoring of the process 210. The system 200 may also include up to m second processes 214 and second process controllers 216.

A first control device 220 is in communication with one or more of the process controllers 212 and 214, for example through a communication network 222. The system 200 may also include up to m second control devices 224, for example, a dedicated control device 224 for each additional process controller 214 and process 216 included in the system 200. The control device 220 serves as an interface with the process controllers 212 and 214 and other below described components of the system 200. Additionally, as is further disclosed below, the control device 220 may include logic to control aspects of the system 200, including a portion or all of processes 210,216. Secondary equipment 240 may also be associated with the processes 210 and 216, for example, lighting, HVAC, environmental, utilities, transport vehicles, and other facility or support equipment or systems that may be monitored or controlled.

The control device 220 may be implemented in various forms depending upon the technology utilized, including but not limited to, dedicated or shared hardware and software located at the site of the process 210, or dedicated or shared hardware and software located remote from the process 210, including hardware/software comprising a cloud computing configuration 238, software as a service, and/or other configurations known in the art.

Advantageously, control device 220 may be configured with or have access over communication network 222 to data and detection techniques to identify the particular model/type of process controller 212,214, sensor elements 250, control elements, 252, health sensors 270, environmental sensors 272, secondary equipment 240, authentication source 280, and client devices 260,290, thus providing a plug-and-play type configurability for components of system 200.

A first participant 230 is associated with one or more of the processes 210 and 216. For example, the first participant 230 may be, but is not limited to, a worker, operator, supervisor, security personnel, logistics planner, or safety personnel, or a third party participant 232, for example, but not limited to, a customer, service or supply vendor, medical personnel, regulatory personnel, or banking or other transactional service provider. The system 200 and also include up to n second participants 234 that may of the types of first or third party participants 230 and 232, or other types of participants associated with the processes 210 and 216. In addition to or as an alternative to process controllers 212, 214, control devices 220, 224, and participants 230, 234, the system 100 may also receive, transmit, and process data with remote/cloud computing 238 and with third party data providers 236, for example weather, environmental, financial/market, geographic, medical, traffic, and other databases.

As illustrated in FIG. 1, available communication technologies, including wired and wireless systems, including WANs such as cellular and other telecommunications systems and the Internet, and LANs such as ETHERNET, BLUETOOTH, and IEEE 802.11 may be included in communications network 222 two provide direct or indirect communication of monitoring, control, and other data between the various participants 230 and 234, control devices 220 and 224, process controllers 212 and 214, and secondary equipment 240, including but not limited to the communication flows shown in FIG. 1. Thus, the mode of communication between the components of a system 200 is only critical in that it provide the desired level of security and integrity appropriate for the processes 210 and 216 and participants 230 and 234.

Figure 2:
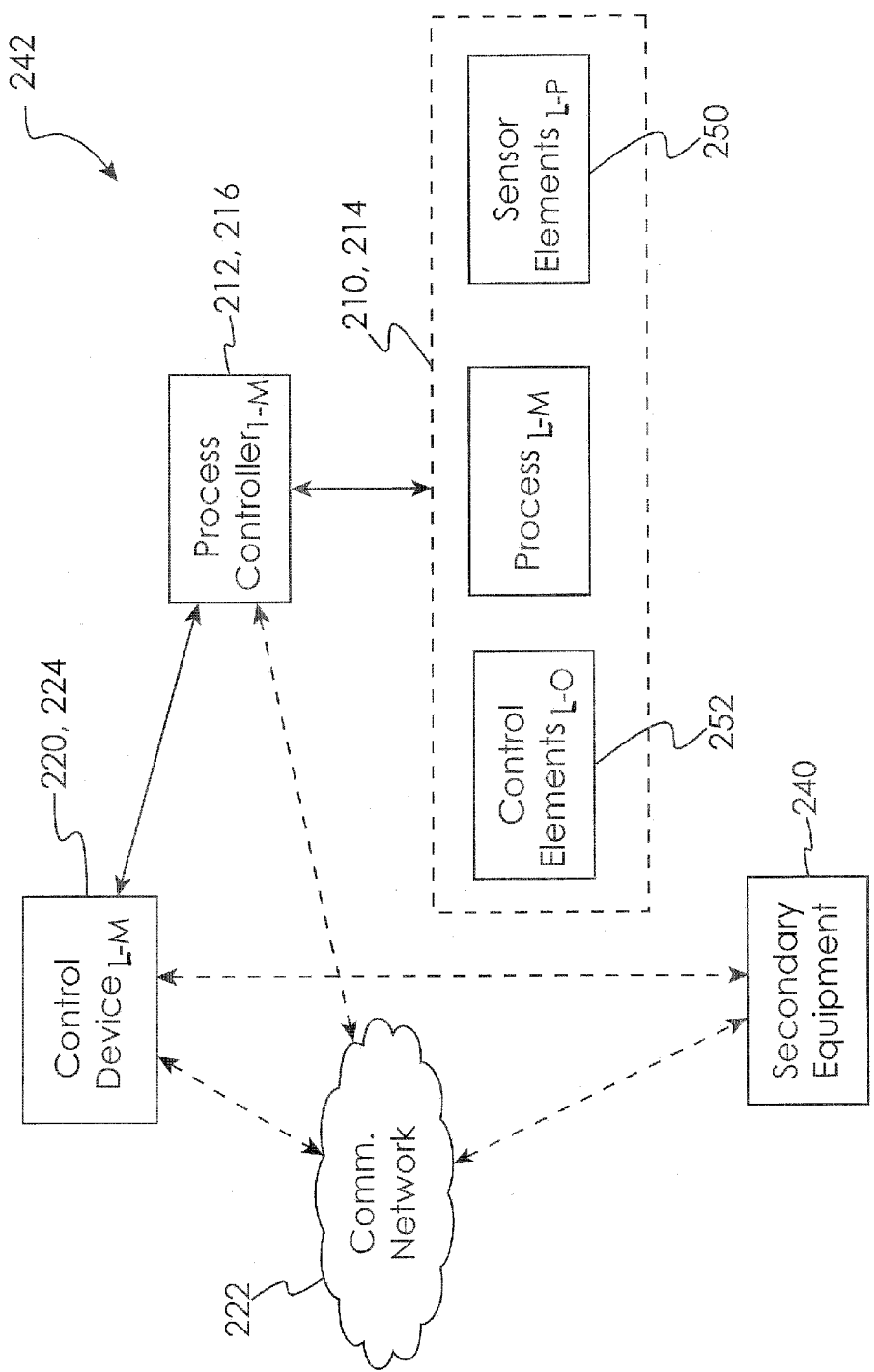
FIG. 2 is a schematic block diagram of the process portion of the system of FIG. 1.

Referring to FIG. 2, a process portion 242 of the system 200 is illustrated in schematic block diagram format. Each of the processes 210, 214, may include one or more sensor elements 250 and one or more control elements 252. Examples of the types of sensor elements 250 include, but are not limited to, sensors that collect data, including images, quantity, quality, volume, sound, temperature, rate, load, torque, pressure, current, voltage, and environmental conditions. Examples of the types of control elements 252 include, but are not limited to, actuating elements such as motors, valves, gates, and radiating elements such as heaters and coolers. Such sensor elements 250 and control elements 252 may be not only be physically and/or relationally associated with a fixed process 210, but also with a participant 230, control device 220, secondary equipment 240, and other aspects of system 200, for example a transport vehicle used in or subsequent to a process 210.

The specific number and types of sensor elements 250 and control elements 252 included in a particular process 210 and 214 will depend on the type of process and the level of control and monitoring desired. As discussed above for FIG. 1, direct or indirect communication of monitoring, control, and other data between the various participants 230 and 234, control devices 220 and 224, process controllers 212 and 214, control elements 252, sensor elements 250 secondary equipment 240, including over communications network 222, is contemplated, including but not limited to the communication flows shown in FIG. 2.

Figure 3:
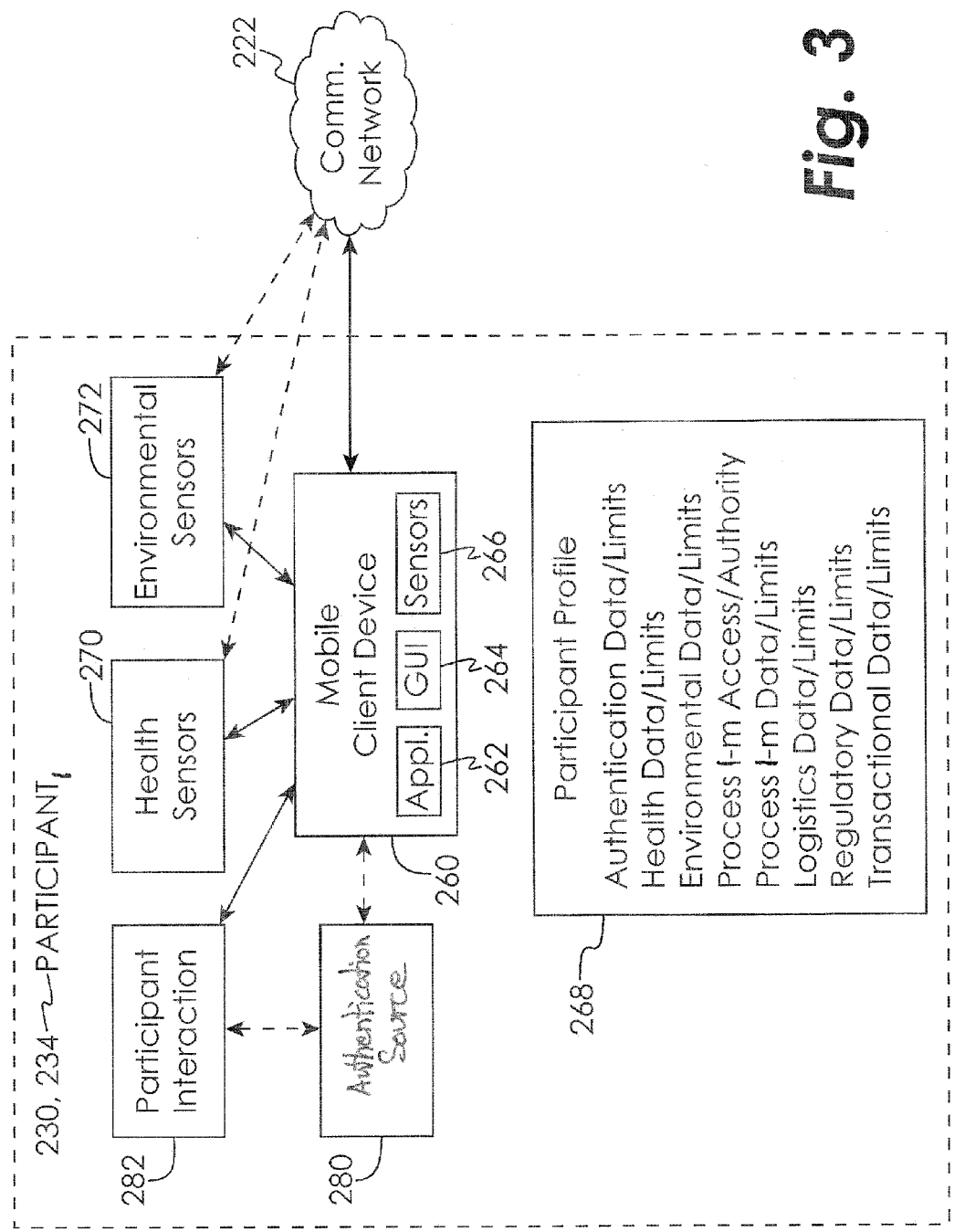
FIG. 3 is a schematic block diagram of the participant portion of the system of FIG. 1.

Referring to FIG. 3, a participant 230 portion of the system 200 is illustrated in schematic block diagram format, and can include a mobile client device 260, participant profile 268, health sensors 270, and environmental sensors 272. The mobile client device 260 includes handheld and wearable electronic devices having a processor (not shown) capable of executing an application 262, a GUI 264, and capable of wireless communication, for example using the communications network 222. Examples of such mobile client devices 260 include, but are not limited to, smart phones and tablet computers. Such devices can also be attached to a mounting device, for example at the participant's forearm, at a control station, driver's seat, or other location convenient for access by participant's access. The application 262 may be a complete enablement of the various functions described herein, or may be a distributed process solution, for example, simply a web browser, or other interface that enables the GUI 264 and other features of the mobile client device 260, but provides the processing on other hardware, for example, but not limited to, at control devices 220,224, or remote/cloud device 238.

The mobile client device 260 may include sensors 266, for example, but not limited to, audio, GPS, accelerometers, and imaging. The sensors 266 included in mobile client device 260 may also be used to supplement the data required by other components of system 200. For example, if control device 220 is installed in a fixed location for a particular process 212, upon the initial installation and setup, a mobile client device 260 used by participant 230 may be used to flash the GPS location of the control device 220 to be stored by the control device 220 or other data storage portion of system 200, thus eliminating the need to include GPS sensors in fixed components of the system 200.

The health sensors 270 provide the system 200 with the data relating to the real-time health of the participant 230, and may be used to monitor and detect developing health risks, medical emergencies, and various states of the participant 230, for example, level of workload and stress. The types of health sensors 270 may vary depending particular types of health risks associated with the process 210, 216, and/or participant 230. For example, health sensors 270 may include but is not limited to pulse, respirations, perspiration, and body temperature. The health sensors 270 may be incorporated into or separate from the mobile client device 260. Depending on the profile data and limits that are preset, detection of health events could result, for example, in intervention by the control device 220 in the process 210,216, alert of other participant(s) 230,232,234, and/or opening an audio or other communications channel with the participant 230 and another participant 232,234.

The environmental sensors 272 provide the system 200 with the data relating to the real-time environmental data in the vicinity of the participants 230, 234 and/or the process 210, 216, and may be used to monitor and detect developing environmental risks that are hazardous to the participants 230, 234 or the efficiency or efficacy of the process 212, 216. The types of environmental sensors 270 may vary depending particular types of environmental risks associated with the process 210, 216, and/or participant 230, 234. For example, environmental sensors 270 may include but is not limited to detection of temperature, airflow, air quality, spills, toxins or other contaminants, combustibles, and ignition sources. The environmental sensors 270 may be incorporated into or otherwise associated with the mobile client device 260, thus being associated with the participant 230, 234. Alternatively or additionally, the environmental sensors 270 may be incorporated into or associated with the control device 220, 224, or the process 210, 216.

As discussed above for FIG. 1, direct or indirect communication of monitoring, control, and other data between the various participants 230 and 234, control devices 220 and 224, process controllers 212 and 214, mobile client devices 260, health sensors 270, environmental sensors 272, and authentication source 280, including over communications network 222, is contemplated, including but not limited to the communication flows shown in FIG. 3.

Further referring to FIG. 3, a participant profile 268 includes data and limits associated with participant 230. Such data and limits include logging of data associated with system 200, including but not limited to captures of GUI 264,294, as well as data and limits that implement the monitoring, controlling, and authorizing for improving the safety, security, efficiency and other aspects of the processes 210, 216 and participants 230, 234. Data and limits may include, but are not limited to, data sets, thresholds, triggers, sequences, ranges, functions, and algorithms, relating to the components of system 200 and what those components relate too.

Data and limits may be used by various components of the system 200, including the mobile client device 260 and control device 220. Data and limits may include is not limited to authentication and health relating to participant 230; environmental conditions relating to participant 230 and process 210,216; skills and qualifications, process 210,216 access, authority, data, and limits; and logistics, regulatory, and transactional aspects specific to participant 230 or in relation to and relating solely to any of the other components of system 200, including third party participant discussed below. The participant profile 268 may be stored in part or in whole using control device 220, mobile client device 260, or another portion of system 200, including a cloud computing device 238. For example, such participant profiles can define the access level of and/or authority relating to various other participants and other components of system 200. For example some participants 230,232.234 may only have authorization to observe various data or other aspects of particular participants, processes, and other components of system 200, while another participant 230 may have greater selective interaction, for example, consent, control, or other limits and rights over particular aspects of system 200.

Figure 4:
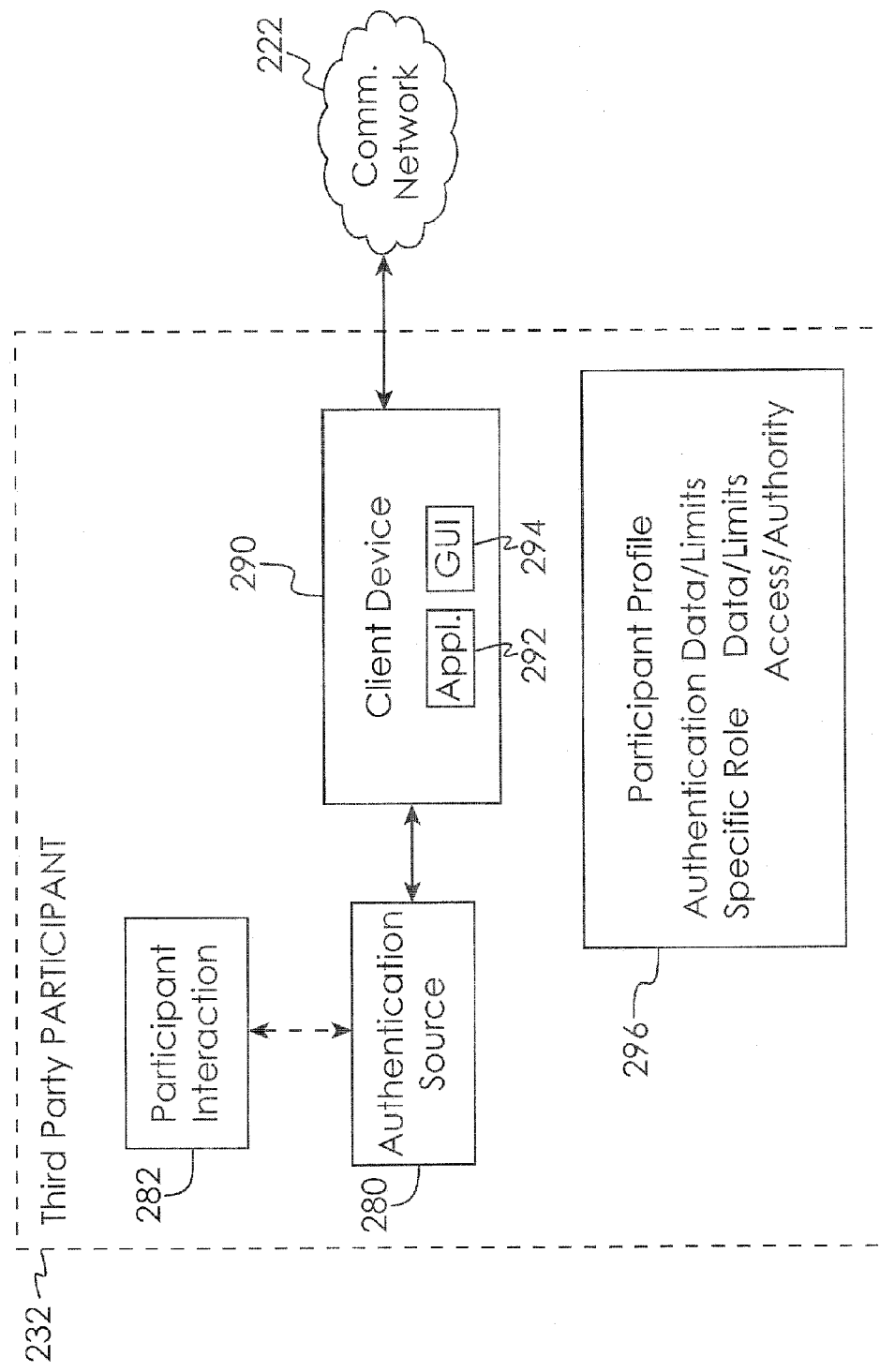
FIG. 4 is a schematic block diagram of a third party participant portion of the system of FIG. 1.
Figure 5:
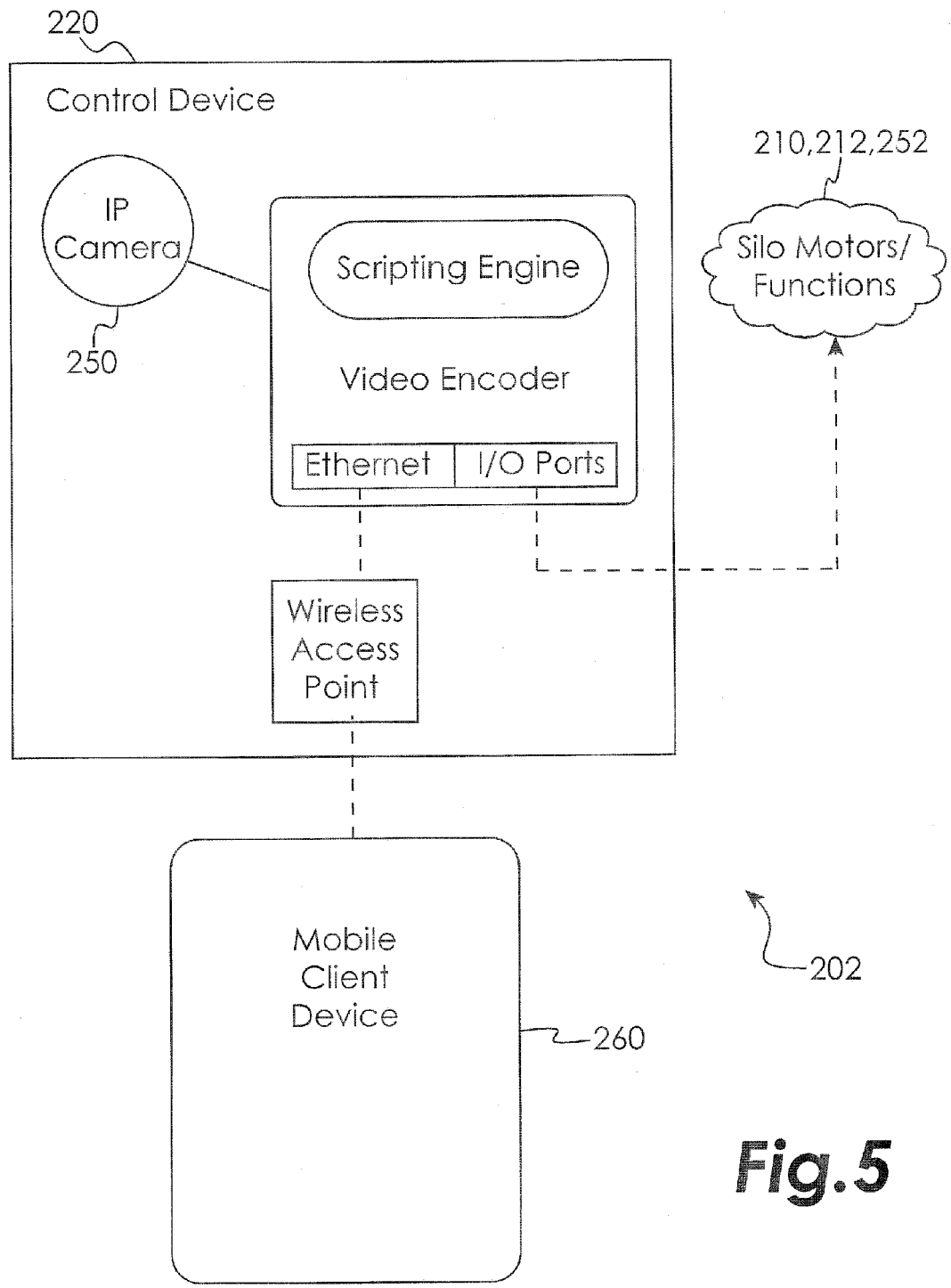
FIG. 5 is a schematic block diagram of an illustrative embodiment of the system of FIG. 1 adapted for monitoring and controlling a commodity load process and monitoring and authorizing participants.
Figure 6A:
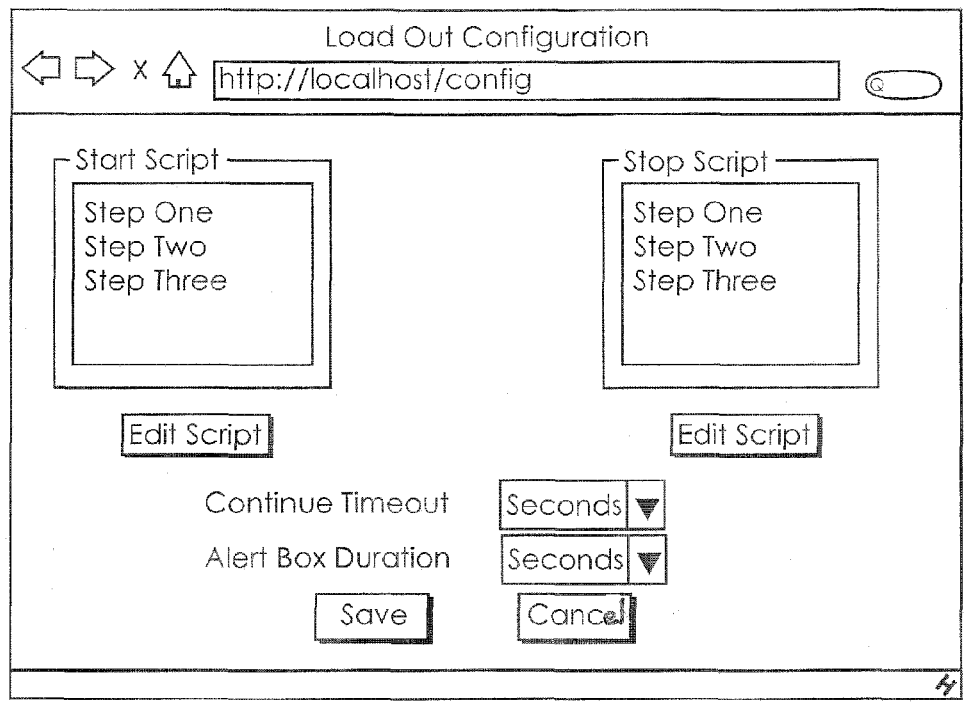
FIG. 6A is an illustrative control device 220 GUI screenshot of the system of FIG. 5 illustrating process profile limitations and data, including process scripts, associated with the control device 220 and mobile client device 260.
Figure 6B:
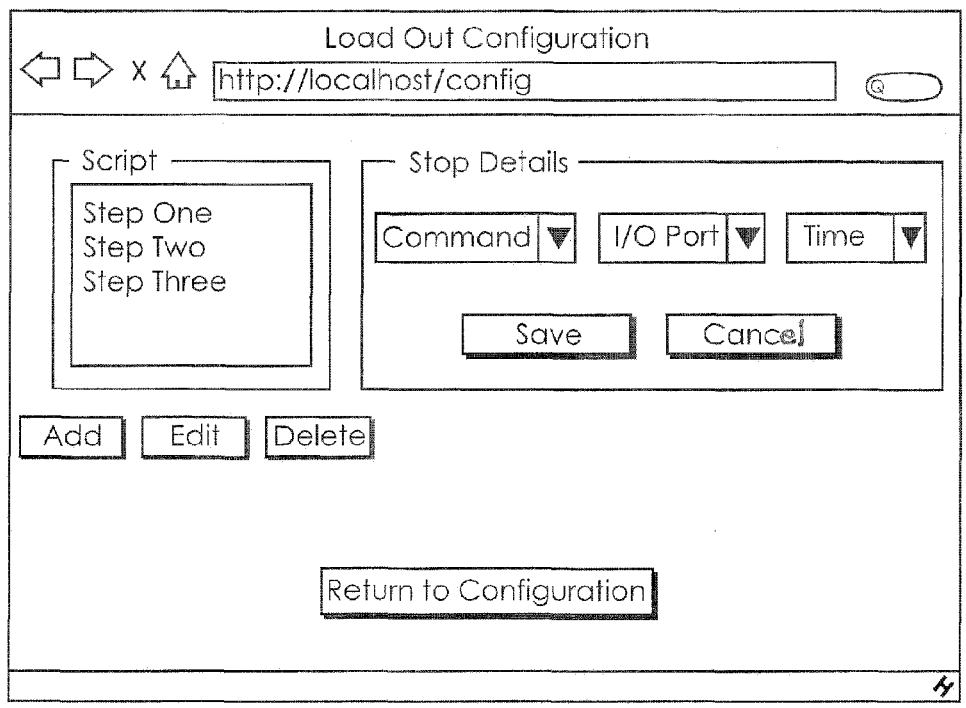
FIG. 6B is an illustrative control device 220 GUI screenshot of the system of FIG. 5 illustrating process profile limitations and data, including process scripts details associated with the control device 220 interaction with the process 210, process controller 212, and control elements 252.

Referring to FIG. 4, a third party participant 232 portion of the system 200 is illustrated in schematic block diagram format, and can include a client device 290, participant profile 296, authentication source 280, and participant interaction 282. The client device 260 may include a mobile device or a non-mobile device, for example a PC, having a processor (not shown) capable of executing an application 292, a GUI 294, and capable communication, for example using the communications network 222. Third party participants 232 include supervisors, customers, vendors, regulatory, and logistics participants. For example, those that are further removed from the processes 210, 216, but have an interest in it. For example, customers, vendors, and logistics participants 232 may require information to schedule, coordinate, direct, modify, or otherwise interact with aspects of the system 200, including processes 210, 216 or related matters.

For example, in a system 200 involving a loading process 210 and a transport process 216 at multiple facilities with multiple transport vehicles, a backup or other slowdown in the operations at one facility can be easily taken into account across the system by a supervisor logistics participant 232 who is monitoring the various state of loading and transport across the system 200. Thus, with such real-time conductivity of components of system 200, including real-time location information for participants 230,234 that may be in-transit via the GPS or other sensor 266 of mobile client device 260, supervising logistics participant 232 can thus redirect resources accordingly, including interacting as required with various participants 230,232,234 and/or various processes 210,216, in light of the event. Additionally, process profile data/limits could take into account such possible events and automatically respond as required across components of system 200 by selective interacting with participants 230,232, 234 and processes 210,216 to account for the event.

A regulatory third party participant 232 may be, for example, a transportation governmental entity that requires reporting and/or tracking of various aspects of hazardous or non-hazardous materials transport. Data needed for such reporting/tracking would be readily available in real-time in system 200 and thus accessible by or reportable to such a third party participant 232 having appropriate authentication.

Another example of an added benefit is the incorporation of third party participants 232, such as transactional participants. Such a participant 232 and the profile data and limits associated with the participant and system 200 could effect payment or another contractual or other obligation based on the data confirmation of a precedent event. For example, the completion of loading or other delivery once confirmed by a participant 230, control device 220, or other component of system 200, and communicated to participant 232 could manually or automatically, through the profile data and limits, trigger payment of funds to a party to whom they are due.

The incorporation of participant profiles 238, mobile client devices 260, access and/or required consent of particular multiple participants 230, 232, 234, and other aspects of system 200 allows processes 210, 216 to be monitored, data mined, and controlled based on many more external factors, considerations, and efficiencies. Additionally, the security and safety of the processes 210, 216 and participants 230, 232,234 can be enhanced with the communications conductivity, monitoring, and participant specific data and limits taken in consideration. Benefits can especially be realized in hazardous environments with such monitoring and requiring the initial and/or continuing consent of peer, supervisor, or third party participants 230, 232, 234 in order for a particular process or portion of a process 210,216 to be selectively proceed.

A participant's 230,234 arrival at a particular location may require manual login/authentication with system 200 before selective interaction is enabled. Alternatively, depending on configurations such as the data/limits stored with a participant profile 268, an automatic login/authentication providing at least a first level of selective interaction and/or access to a limited portion of a system 200 may be provided by the mobile client device 260 and authentication source 280. Authentication source 280 may be any one of a range of sources known in the art, and may include multiple aspects, for example, verification of identity as well as verification of location of participant 230,234. Such sources 280 can include login information, RF or other electronic keys, GPS location, video recognition, unique device identifier code (for example, UDID, IMEI, CDN, ICCID), or a locally displayed code, whether static or changing, that is imaged, sensed, or manually entered from the authentication source 280 into the mobile client device 260.

Automatic authentication could also be used by control device 220 to maintain a security access log for particular locations associated with system 200, and to trigger automatic selective interaction to stop, start, or modify, some or all aspects of secondary equipment 240, and processes 210,216. For example, turning on lighting, adjusting HVAC temperature, or starting or stopping process 210 as desired.

Introducing such a social network aspect to a system 100 can improve safety and efficiency without necessarily requiring multiple participants to be physically located at the particular process 210,216. On the other hand, data and limits for a particular process 210 could specify not only consent but also physical proximity of predetermined participants 230, 232,234 when the process 210 or level of experience or other limitations of a particular participant 230 warrants it.

The resulting fusion of historic, reference, and real time data along with limits associated with the participants 230, 234 and the processes 210, 216 enables event monitoring and decision matrixes that can provide improved safety, efficiency, and other aspects of the system 200. For example, historic health data and limits associated with a particular participant 230 interacting with a particular process 210 can be used to detect an increased stress level above a preset limit, or a rate of increase above a preset limit, that indicates a need to slow or stop the process 210, or a need to relieve the participant 230 with another participant 234 for a period of rest. For example, a health sensor 270 may provide heart rate data is for the basis of such a decision matrix implemented by one of the control device 220, mobile client device 260, or another portion of the system 200.

Data developed by sensor elements 250 may be more complex than just discrete data. For example, video data could be processed with video algorithms as are known in the art to detect visually particular events, for example, the arrival of a transport vehicle at a particular process 210 position, the completion of filling of a transport vehicle, to authenticate the identity or confirm the location of a participant 230, or to determine quantity or quality of materials or goods relating to process 210. For example, by employment of video detection and recognition tools such as those available from Axis Communications AB of Lund, Sweden.

Data displayed or otherwise available to client devices 260,290 may be in the form the data is provided, transformed into a more useful format, and/or selected for transmission to another component of system 200. In one embodiment, where data output is not readily available in digital form from a process controller 212,214, a sensor element 250 may include an imaging device that simply captures and transmits to the client devices 260,290 the screen or other GUI of process controller 212,214, thus enabling remote monitoring even where communication connections are not provided by the existing hardware. In such an existing process controller 212 where conductivity of control of process 210 is not provided, the system 200 may at least provide monitoring and logging of data, selective interaction with other processes 216 and other components of system 200 based on the monitoring and logging of data of the uncontrolled process 210. Additionally, even if complex control of process is not available via process controller 212, the control device 220 may be integrated into process 210 in such a way as to provide at least safety shutdown or other discrete control of the process 210, for example, by halting raw materials, power, or other inputs into the process 210.

Figure 7A:
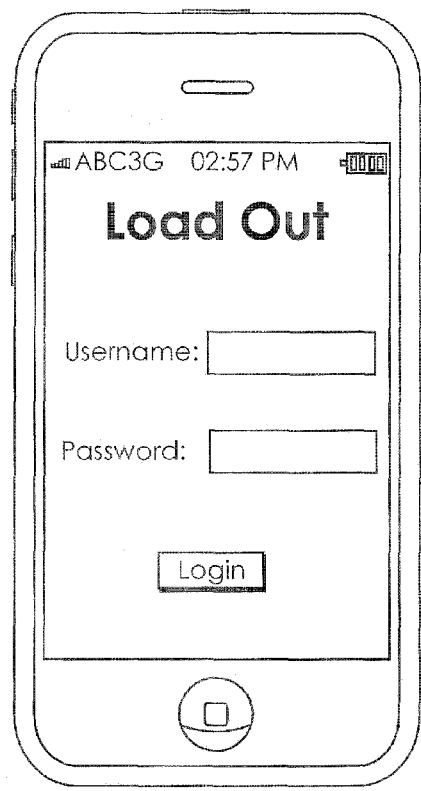
FIG. 7A is an illustrative mobile client device 260 GUI screenshot of the system of FIG. 5 illustrating authentication of a participant.
Figure 7B:
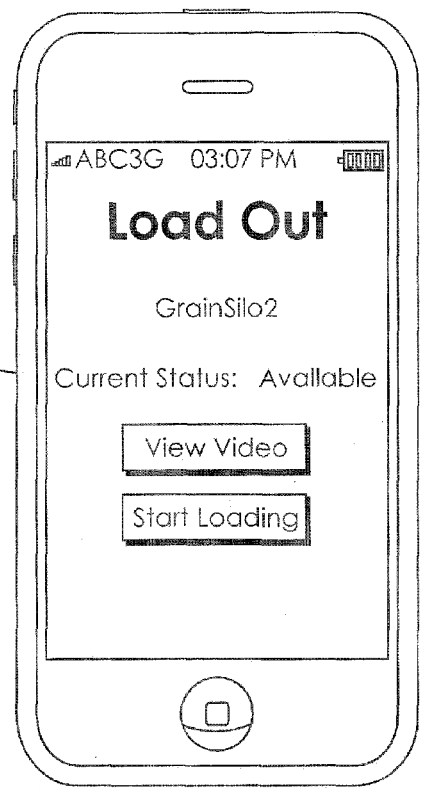
FIG. 7B is an illustrative mobile client device 260 GUI screenshot of the system of FIG. 5 illustrating participant interaction 282 options.
Figure 7C:
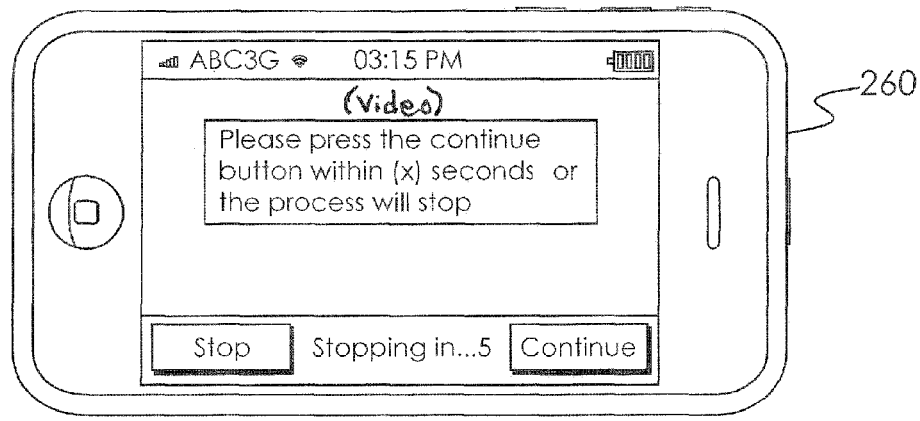
Figure 8:
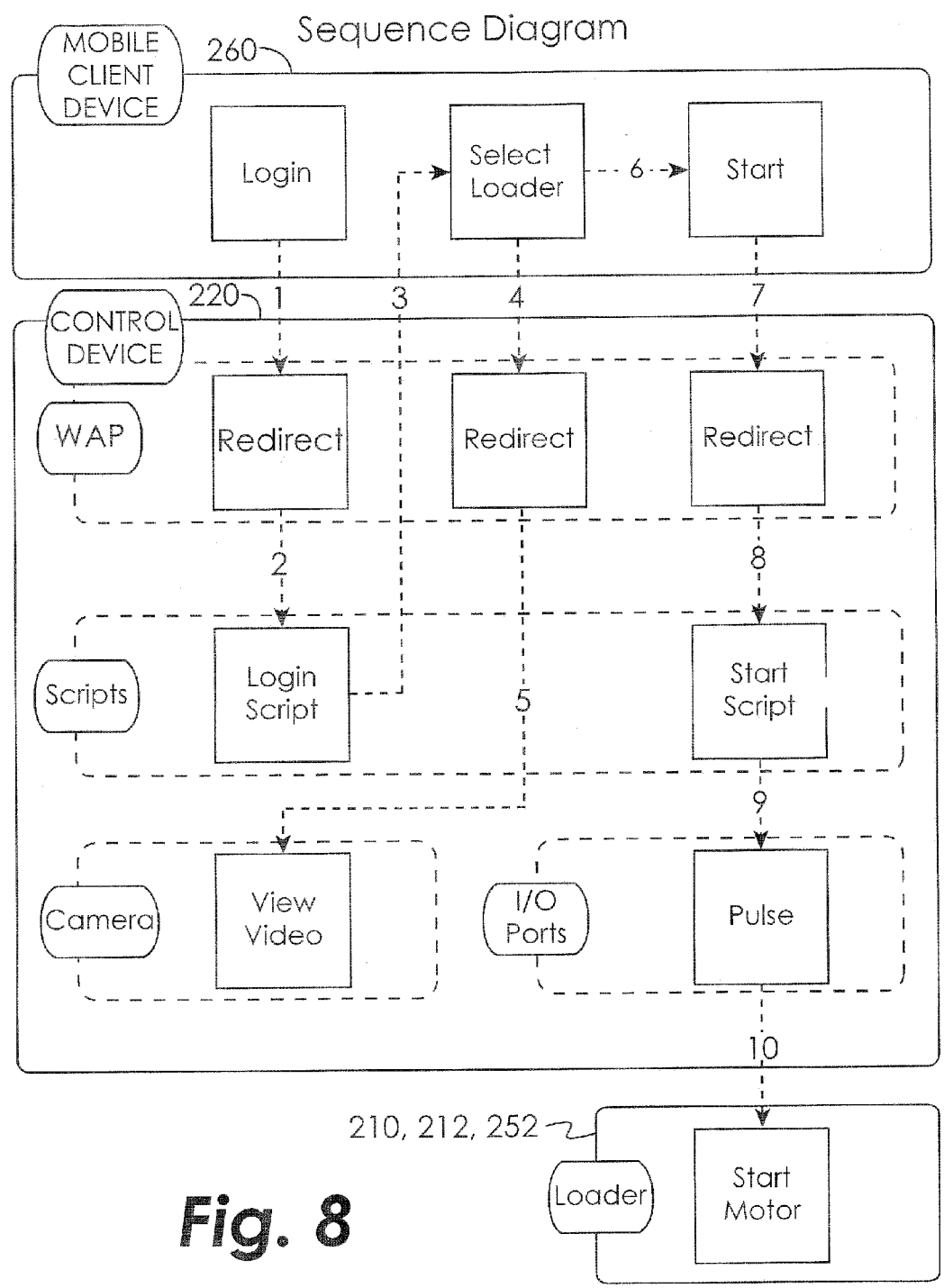
FIG. 8 is an illustrative control process flow for the system of FIG. 5.

A keep alive safety soft switch (FIG. 7F) may be incorporated into mobile client device 260. Such a switch triggered by a timer must be pressed periodically, or an automatic signal otherwise periodically sent from mobile client device 260 before the expiration of a preset timer, else the control device 220 may be have profile limits that selectively interacts with process controller 212 to modify or stop the process 210 that is being monitored or controlled by the participant 230.

Such a feature, or other alternative safety features, can provide added safety for the processes 210,212 and participants 230,232 in the event of lost communication between the mobile client device 260 and control device 220, or in the event of the extended lack of attention of the participant 230 to the process 210. A similar safety feature can be provided, for example, by acceleration sensors 266 or authentication source 280 to detect participant 230 dropping the mobile client device 260, or by sensing movement of participant 230 away from a predefined location in relation to process 210, or remaining away for more than a preset time limit, resulting in the control device selectively interacting to start, stop, or modify the process 210.

Mobile client device 260 may be configured to provides the same features if a phone call is received, or could be configured by the profile to lock out calls, particular calls, or other features/capabilities of mobile client device 260 depending on the process 210 in which the participant 230 is engaged.

In some cases existing sensor elements 250 may not easily interface electronically with the system 220. In such cases, for example, manual vehicle weight scales, such data may be entered into mobile client device 260 by the participant 230 via the GUI 262.

Data received, displayed, and or logged may not only relate to the processes 210,216, but also other aspects of the system 200, including for example, maintenance or other performance data about control and sensor elements 250, 252. Such data may be used to predict and/or detect failure of components of the process 210,216 and secondary equipment 240.

Figure 12:
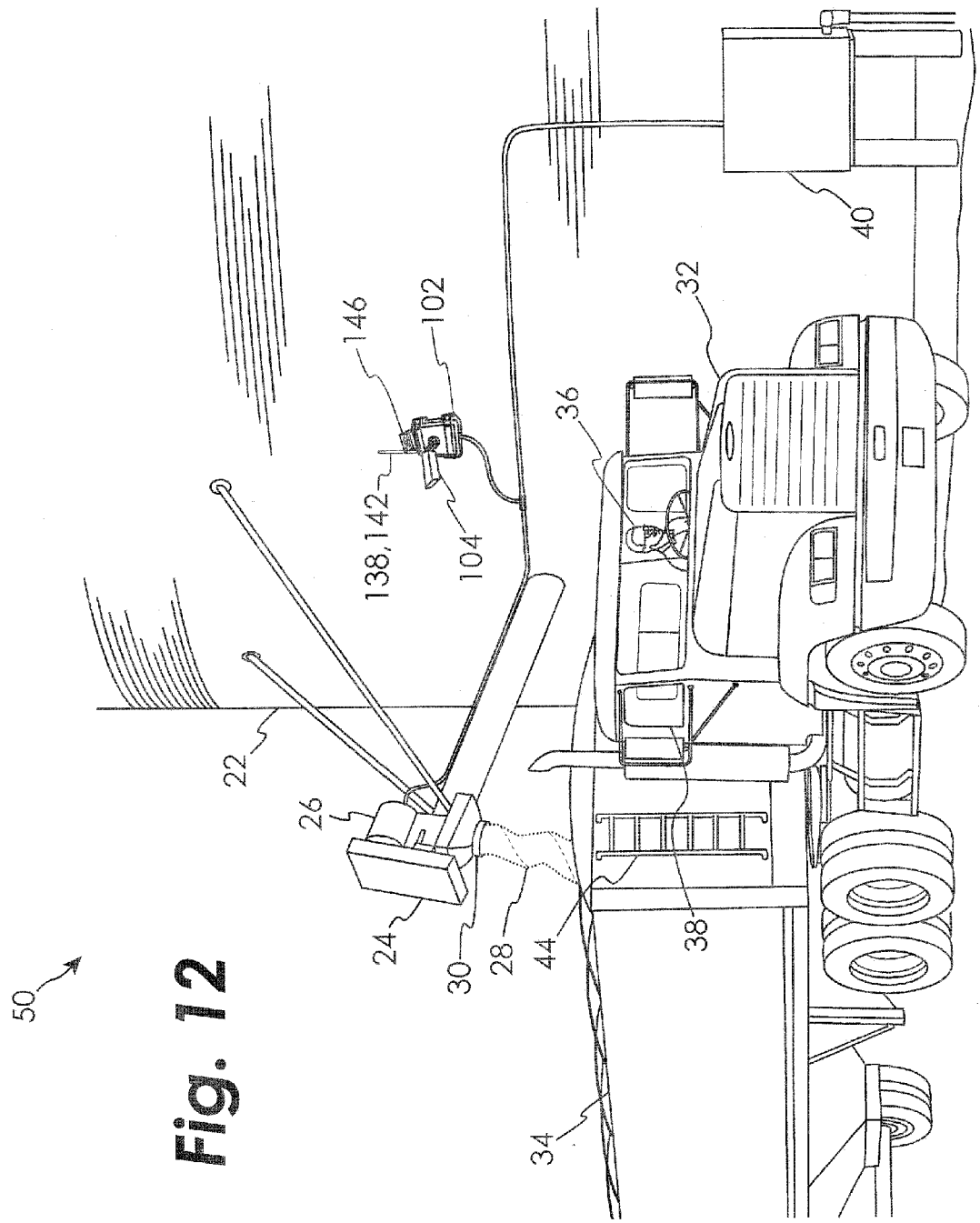
FIG. 12 illustrates the commodity storage and industrial process of FIG. 91 adapted with the illustrative monitoring and control system of FIGS. 9 and 10.
Figure 14:
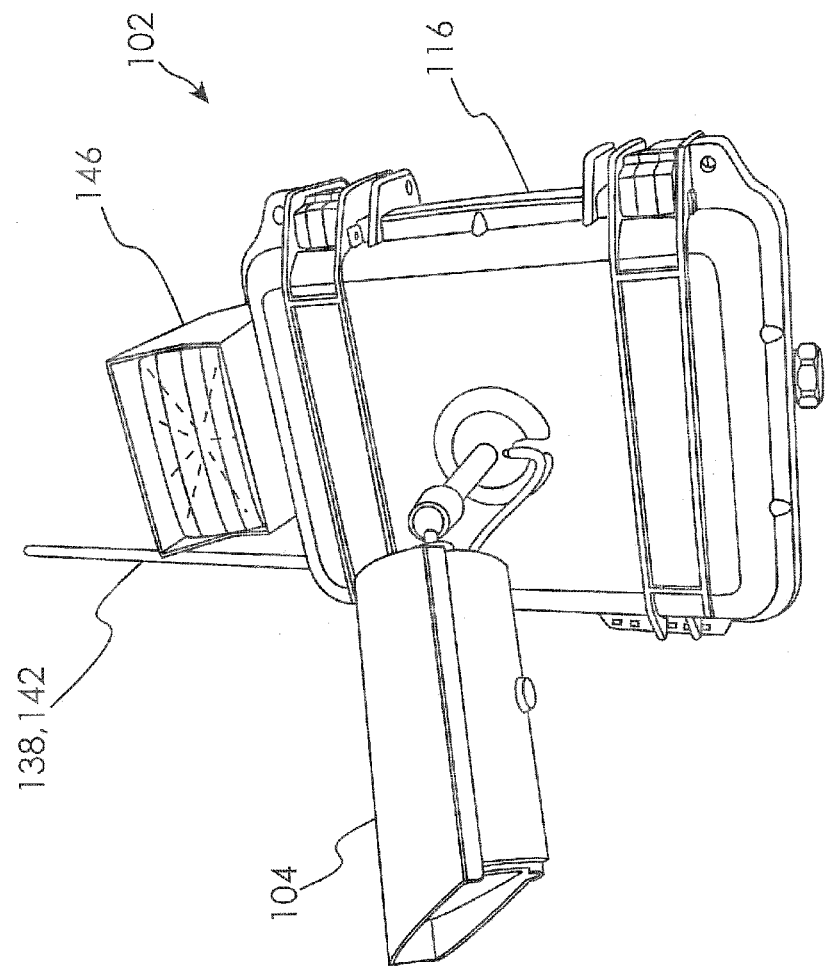
FIG. 14 illustrates a close up view of the commodity storage and industrial process portion of the illustrative monitoring and control system of FIGS. 1-2 and 4.

An illustrative embodiment of a system according to the present invention applied to a commodity storage and loading facility 50 is illustrated in FIG. 12. The facility can include the storage bin 22, process 24, process controller 26, commodity outlet 30, and control box 40, whether part of the prior art system or added, however, the facility 50 further includes an illustrative monitoring and control system 100 (FIGS. 9 and 10) having a industrial system control device 102 and one or more imaging devices 104 and 106 associated with the facility 50, and a mobile client device 110 associated with the operator 36 and/or transport vehicle 32. Referring to FIGS. 12 and 14, the industrial system control device 102 can be substantially or entirely associated with a weatherproof enclosure 116. For example, the enclosure 116 can house various components (described below) of the control device 102 and can be used to mount components external to the enclosure such as imaging device 104, indicator lamp 146, one or more antennas 138 and 142, and an optional wired communication link port (not shown), for example an Ethernet connecting port. Such a connecting port can be used to provide set-up and maintenance for monitoring and control system 100, or for a wired portion of the system 100, for example, to provide image feeds 112 and 114 to an alternative display, for example, located at a supervisory location.

Figure 10:
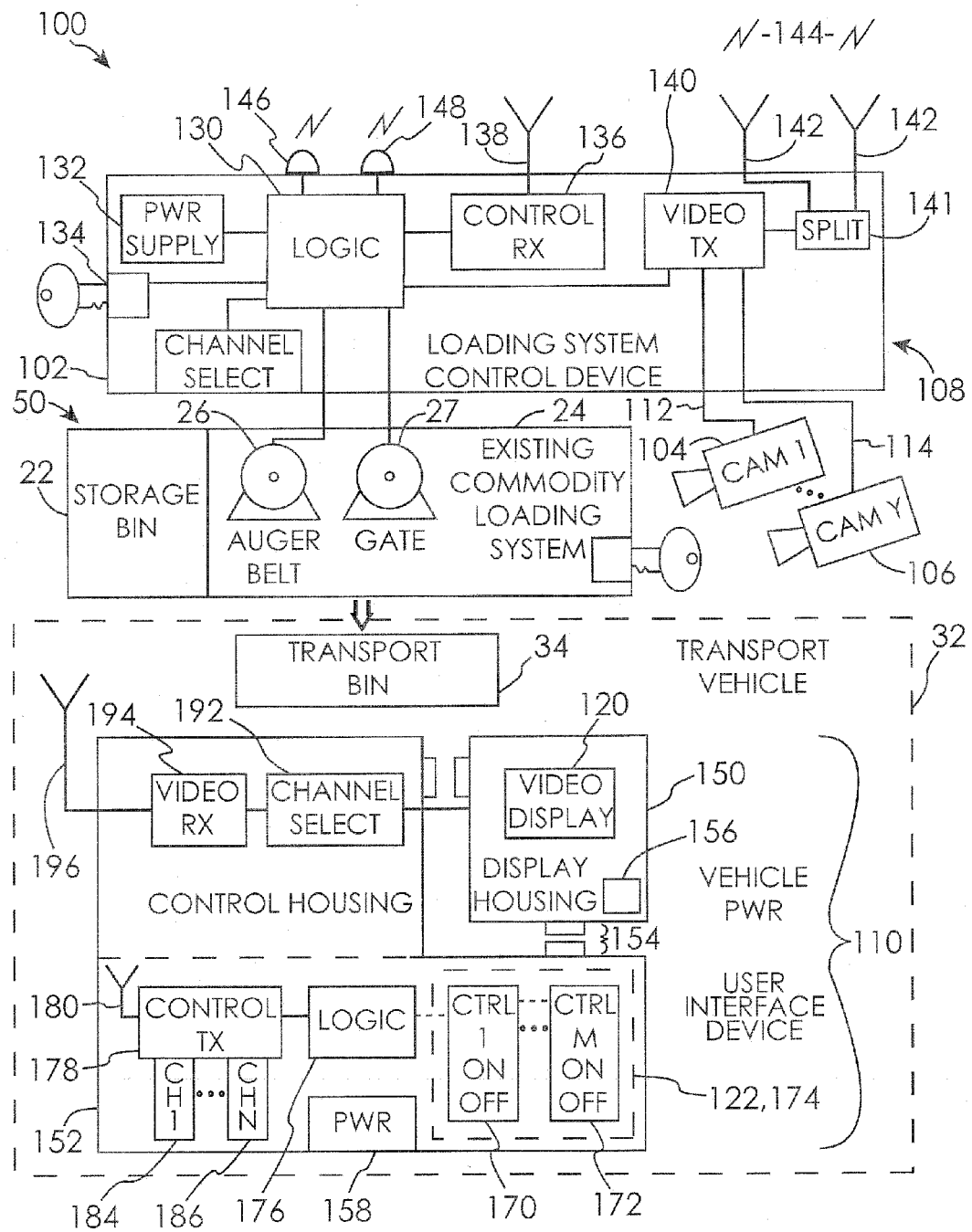
FIG. 10 is a schematic block diagram of the monitoring and control system of FIG. 9.

Referring to FIG. 10, the industrial system control device 102 is adapted to transmit one or more visual feeds (periodic images or video stream) 112 and 114 from the one or more image devices 104 and 106 and to control the commodity process 24, for example auger or belt motor or other process controller 26 and/or bi-directional gate motor 27 (FIG. 13), for example, as is used on an overhead gravity feed industrial process. One or more of the imaging devices 104 and 106 may be adapted to provide a discernable visual feeds 112 or 114 in a low or no light environment.

Figure 13:
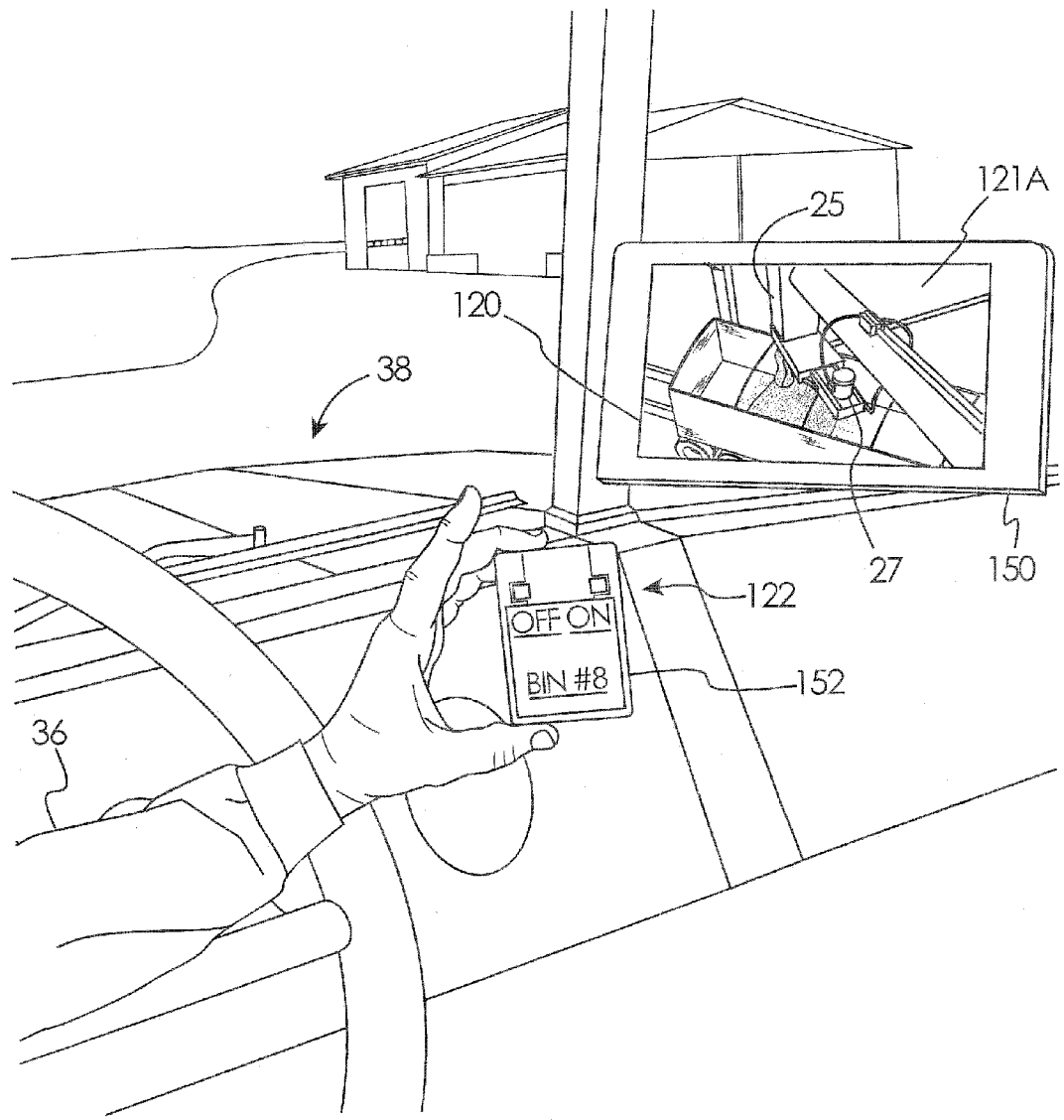
FIG. 13 illustrates the in-cab transport vehicle portions of the illustrative monitoring and control system of FIGS. 9-10 and 12.

Referring to FIG. 13, one embodiment of the illustrative monitoring and control system 100 includes a mobile client device 110 having a separate display housing 150 and control housing 152, both accessible by the operator 36, for example, for use as a handheld and/or mounted unit(s) from inside vehicle cab 38. The display housing 150 includes a display for viewing at least one of the visual feeds 112 and 114 of the commodity 28 loading and/or loaded into the transport bin 34. The control housing 152 includes a switch array 122 having one or more soft or hard switches for controlling the commodity process 24. Optionally, the display housing 150 and/or control housing 152 may also include one or more soft or hard switches for selecting between the visual feeds 112 and 114 and other optional image and control features discussed below.

Advantageously, the mobile client device 110 and the industrial system control device 102 can be adapted to communicate wirelessly, for example, via RF, thereby allowing the industrial system control device 102 to be associated with the commodity process 24. For example, the industrial system control device 102 can be mounted on the side of the commodity bin 22 (FIG. 12) in an advantageous vantage point for image device 104 to capture an image feed 112 of the interior of the transport bin 34 being loaded with commodity 28 while the mobile client device 110 is in wireless communication from the vehicle cab 38 with the industrial system control device 102. In one illustrative embodiment, the control housing 152 includes a typical RF fob similar to those used for remote automotive locking and unlocking.

In an alternative illustrative embodiment shown in FIGS. 16A-16C, the mobile client device 110 includes a handheld mobile device 160 providing the display 120, the soft or hard switch array 122, and wireless communication with the control device 102. For example, handheld mobile devices 160 such as those available from Apple, Inc. of Cupertino, Calif., or Palm, Inc. of Sunnyvale, Calif. The handheld mobile device 160 can be enabled by an application 162 implementing the control features and methods disclosed herein. For example, the handheld mobile device 160 can utilize a web browser or other standard software to access monitoring and/or control features of the industrial system control device 102 via the internet or other IP connection, or specific software, for example, implemented as an "app" 162 to provide monitoring and/or control, for example, such as those features and methods disclosed herein.

For example, referring to FIG. 16A-16C, an exemplary mobile device 160 is shown equipped with a web browser or application 162 to provide interfacing with the control device 120, including for example a webserver or other internet software communications application associated with control device 120. Referring to FIG. 16A, the application 162 can provide selection from among one of a number of facilities 50 equipped with a monitoring and control system 100, either by geographic location of the mobile device 160, wireless in range, by operator 36 entry, or by operator 36 authentication. The application 162 may also provide frequency selection for communication links 164-166 and login capability. Additionally, the application 162 can provide selection of history or other relevant data and communications, for example, data relating to a specific single or set of facilities 50 or transport bins 34, email, scheduling information, etc. Once the facility 50 is selected, an image feed 112 provides a view 121B suitable to align transport bin 34 under commodity outlet 30.

In some embodiments, outlet 30 may be moveable, and monitoring and control system 100 may be enabled to control the location of outlet 30 relative to transport bin 30. One or more soft switches 170 and 172 provided by application 162 can provide stopping, starting, movement, or other functioning available from the process 24. For example, once transport bin 30 is properly positioned under outlet 30, soft switch 170, for example having a green background and the word "Start", can be touched to enable flow of commodity 28 into transport bin 34 by activating the logic switching unit 130 to activate process controller 27. As shown in FIG. 16C, by monitoring view 121A, as loading proceeds, the transport bin 34 or outlet 30 can be moved relative to one another as required, and the flow of commodity 28 can be stopped by touching soft switch 172, for example, having a red background and the word "Stop".

In one embodiment, a keep alive safety soft switch (FIG. 7F) must be pressed periodically, or an automatic signal otherwise periodically sent from mobile device 160 before the expiration of a preset timer, else the logic switching unit 130 activates process controller 26 to terminate the flow of commodity 28. Such a feature, or other alternative safety features, can terminate flow of commodity 28 in the event of lost communication between the mobile client device 110 and control device 102, or in the event of the extended lack of attention of the operator 36 to the loading process. Other features may also be provided and/or be selectable from the mobile device 160 or other mobile client device 110, for example, weight measured by a scale located under the transport bin 34, flow or volume measurements for commodity 28 provided by process 24, moisture measurements provided by a sensor associated with the process 24, outside audio of the loading process, and other data or information relating to the commodity 28, environment, or transport bin 34 or vehicle 32.

The mobile client device 110 can be used to communicate with the industrial system control device 102 via any communication link known in the art, including for example, a communications link 164 such as Bluetooth, a LAN 166 such as IEEE 802.11, and/or a WAN 168 such as a cellular communications network or the internet. In one illustrative embodiment the mobile client device 110 includes a handheld mobile device 160 as discussed above to provide the image stream monitoring viewable from within the vehicle cab 38 and a separate remote RF "key fob" control housing 152 to provide the control of the industrial system control device 102 from within the vehicle cab 32, for example, to initiate and terminate the flow of commodity 28 into the transport bin 34.

Referring to FIG. 10, the industrial system control device 102 may include a logic switching unit 130 for selectively operating the process 24, for example, including process controllers 26 and 27 such as motors or other process controllers for operating an auger, a belt, an outlet gate, or a translator for an outlet gate, all of which control transfer of the commodity from the storage bin 22. For example, the logic unit 130 may include one or more of a PLC, relay, motor starter, PC or other electronic control and/or switching components and systems known in the art. Alternatively or additionally, to the extent the existing control box 40 or control receiver 136 (discussed below) provides such components and functions for switching the one or more process controllers 26 and 27 (or starters associated with such process controllers), the control box 40 and/or receiver 136 may supplement or serve as the logic unit 130. For example, a two channel remote control receiver such as part number 2CH-SRX, available from ABACOM Technologies of Toronto, Ontario, Canada, can be adapted to generally perform some or all of the functions of control receiver 136 and logic 130.

The illustrative industrial system control device 102 may be activated by providing electrical power to power supply 132 and/or by activating a security and safety feature 134, for example a key, pass code, or card activated software or hardware switch. Additionally, feature 134 may include more than one function/position so that the operator can select whether to activate and/or power one or any combination of the control box 40, the industrial system control device 102, and the image feed device 108 (discussed below).

One or more optional indicators 146 and 148, for example lights, can provide status information regarding the loading control device 102 and/or process 24 components. For example, the first indicator 146 can indicate power is supplied to the loading control device 102, and the second indicator 148 can indicate that the security and safety feature 134 has been satisfied to activate the loading control device 102.

Advantageously, industrial system control device 102 includes an antenna 138 and receiver 136 for receiving control signals from the mobile client device 110. The control signals are processes by logic switching unit 130 for controlling activation and deactivation of the one or more process controllers 26 and 27 that control the flow of commodity 28 from storage bin 22 through process 24 and into the transport bin 34.

Advantageously, the monitoring and control system 100 also includes one or more imaging devices 104 and 106, for example video or IP cameras that provide visual feeds 112 and 114 to a video transmitter 140. An optional image feed device 108 (which may be optionally separate from the industrial system control device 102) can include a video transmitter 140, an optional signal splitter 141, and one or more antennas 142 to provide an image feed separate from the communication links 164-168. The video transmitter 140 may be, for example, a 2.4 MHz system as is known in the art and that provides one or more wireless video signals 144 that are transmitted to the mobile client device 110 for remote viewing of the loading operation. As for industrial system control device 102, the image feed device 108 may be activated by providing power to power supply 132, for example, by the activation of the a security and safety switch 134, discussed above. Additionally or alternatively, operation of the image feed device 108 may also be separately activated or otherwise controlled, for example, by mobile client device 110 and logic switching unit 130. If required, the antennas 138 and 142 may be mounted external and/or internal to the enclosure 116. In one illustrative embodiment all communications between the industrial system control device 102 and mobile client device 110 are provided by one of communication links 164-168. In another illustrative embodiment at least some of the communications between the industrial system control device 102 and mobile client device 110 are provided as wired connections.

Referring to FIG. 10, one illustrative embodiment of the mobile client device 110 includes a display housing portion 150 including a display 120, and a control housing portion 152 including a control transmitter 178, a battery power source 158, and a control switch array 122. The display housing 150 or control housing 152 may also house components associated with the display 120, including for example, the antenna 196, the video receiver 194, and a channel selector 192. Optionally, the control housing portion 152 can be physically separated into two devices, in which case the display housing 150 would also include its own power source 156. In FIG. 13, a display housing 150 is illustrated mounted in the cab 38 of the transport vehicle 32, for example using a windshield suction mount (not shown); however, other mounting or location of the display housing 150 can be utilized, for example, the display housing 150 can be located outside of the vehicle 32 but accessible or viewable from the vehicle cab 38.

The display housing 150 can include a display 120, for example a TFT or LCD display and a power supply 156, for example, powered by vehicle or battery power. The signals 144 transmitting the one or more visual feeds 112 and 114 are received by receiver 194 and displayed on display 120 so that the operator 36 can remotely monitor the operation of the commodity process 24 and the volume of commodity 28 loaded into the transport bin 34. If more than one visual feed 112 and 114 is provided, the feeds 112 and 114 can be selectively displayed on display 120, for example, as selected by the logic or switch setting associated with the channel select 192. For example, as show in FIG. 12, a first view 121A associated with image feed 112 is displayed and subsequently, by timer logic associated with the channel select 192 or by the operator making a switch selection associated with channel select 192, a second viewing angle or location associated with the visual feed 114 can be displayed. Optionally, more than one of the one or more visual feeds 112 and 114 can be displayed simultaneously on display 120.

Figure 9:
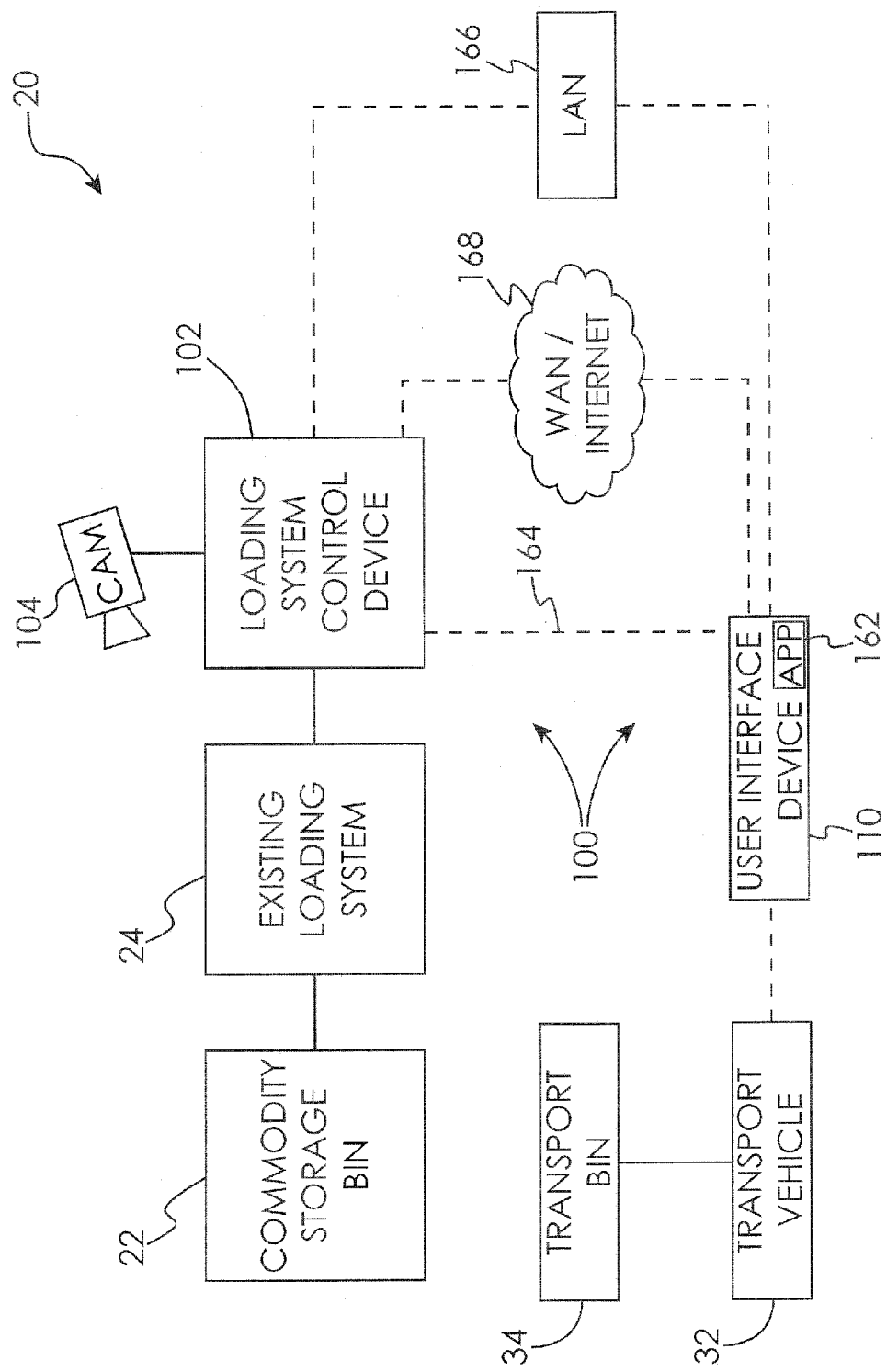
FIG. 9 is an overview schematic block diagram of a commodity storage and industrial process having an a second illustrative monitoring and control system for commodity loading.

Additionally and optionally, as shown in FIG. 9, the control housing 152 (or the one or both control housing if in separate housings as discussed above) that houses the switch array 122 and channel select 192 may selectively detached from the display housing 150 using releasable coupling(s) 154, for example hook and loop fasteners, thereby allowing the operator 36 to carry the control housing 152 (and associated switch array 122) out of the vehicle cab 38. Advantageously, the control housing 152 can include battery power 158, logic 176 for receiving and processing signals from the one or more switches 170 and 172 of switch array 122, and transmitter 178 and antenna 180 for transmitting industrial process control signals to the control receiver 136 of the industrial system control device 102, thereby remotely controlling the operation of the commodity process 24. In some embodiments of the mobile client device 110, the logic 176 may be provided by software, for example, an application 162 associated with a hand held mobile device 160. Additionally, the control housing 152 may include a safety device(s) 174, for example a locking device or a movable cover over switch array 122, to prevent inadvertent actuation of the switches 170 and 172. The control housing 152 may also include lights or other indication device(s) relating to the status of the process 24, the industrial system control device 102, and/or the wireless communication connection with the loading control system 102. Optionally, the control housing 152 can be weatherproof.

Because it may be desirable for one mobile client device 110 be operable with more than one industrial system control device 102 at a single facility 50 or at various different facilities 50, the control transmitter 178 can have one or more associated modules 184 and 186 or software selectable key or other parameter that enables the mobile client device 110 to be associated with a particular industrial system control device 102. For example the modules 184 and 186 may each provide a selected channel, frequency, code, or key. Additionally or alternatively, an input device associated with the control housing 152 may be used to enter the proper key, for example a key pad, magnetic strip reader, RF ID device, finger print reader, touch screen, or the like. The mobile client device 110 may also include labeling or changing indication/indicator associated with the specific facility 50, for example the specific storage bin(s) 22 or process controller(s) 26 and 27 associated with the selected commodity process 24.

In an alternative embodiment of the present monitoring and control system, the mobile client device 110 is mounted in the environment of the process 24 and commodity storage bin 22 such that it can be accessed through the window of the cab 28 of the vehicle 32 to have its bin 34 filled. For example, the mobile client device 110 may be mounted to the ground similar to a drive up ATM, or could be suspended from a movable boom and/or cable. Thus, the mobile client device 110 can be operated from the cab 28, but need not remain in the cab 28, or be wireless.

Alternatively, the control receiver 136 and controller transmitter 178 may be transceivers for bi-directional communication. Also alternatively, the video receiver 194 and video transmitter 140 may be transceivers for bi-directional communication. Also alternatively, the control receiver 136 and video transmitter 140 may be a single combined unit transmitting and receiving a combined or alternating signal 144, for example, over communication links 164-166. Similarly, also alternatively, the control transmitter 178 and the video receiver 194 may be a single combined unit transmitting and receiving a combined signal.

The illustrative monitoring and control system 100 may also include wireless transmission techniques, including those using multiple frequencies, that provide secure transmissions, and security features to limit use to those authorized for access, including for example, passwords, keyed controls, finger print detection activation, and daytime only activation. The monitoring and control system 100 may also include alternative visual display devices, for example, larger screens provided in the area of the vehicle cab 28, visual display of multiple camera angles, and the ability to utilize more than one system simultaneously within a single commodity operation area. The monitoring and control system 100 may also include an alternative imaging device (not shown) source, for example, one mounted on the vehicle and positioned to show the interior of transport bin 34.

The loading facilities 50 for which the monitoring and control system can be associated are not limited to the above illustrative embodiments, but can be adapted to other loading facilities. For example, referring to FIGS. 15A to 15D, typical loading facilities include facilities 60, 70, 80, and 90. As illustrated in FIG. 15A, a facility 60 includes a single auger motor 62 controlled by control device 102 that provides selective flow of commodity 28 from a single storage bin 66. As illustrated in FIG. 15B, a facility 70 includes a single elevator motor 72 (or multiple motors if multiple elevators) and bin process controllers 73, 74, and 75 that are selectively controlled by control device 102 to provide selective flow of commodity 28 from one or more of storage bins 76, 77, and 78. As illustrated in FIG. 15C, a facility 80 includes a single gate process controller 82 controlled by control device 102 that provides selective flow of commodity 28 from a single gravity feed storage bin 86. As illustrated in FIG. 15D, a facility 90 includes a industrial system control device 102 mounted on portable auger unit 91 having a single auger motor 62 controlled by control device 102 that provides selective flow of commodity 28 from a single storage bin 96. The bin 96 may also include a motor or other process controller 93 that can be optionally controlled by control device 102. In another alternative embodiment to that illustrated in FIG. 15D, the portable auger unit 91 in FIG. 15D is operated from a PTO driven tractor or other machine and the bin process controller 93 is controlled by the control device 102.

The monitoring and control system 100 is equally applicable and adaptable for use with unloading or dump facilities (not shown) known in the art and remotely monitoring and controlling the unloading of commodity and the associated process controllers/process (not shown).

While the invention has been illustrated and described in detail in the foregoing drawings and description, the same is to be considered as illustrative and not restrictive in character, it being understood that only illustrative embodiments thereof have been show and described and that all changes and modifications that are within the scope of the claimed subject matter is desired to be protected.

The invention claimed is:

1. A system for monitoring and controlling a tangible process and monitoring and authorizing participants associated with the process, comprising:
    at least one communication network;
    a control device coupled to the at least one communications network and adapted to selectively interact with a first process controller associated with a first process, the first process including process control elements and process sensor elements, the selective interaction including the control device receiving data from the sensor elements and actuating the control elements;
    a first client device that is mobile, coupled to the at least one communications network, and having an application and a GUI enabling a first participant to selectively interact with the first process through the first control device;
    a first participant profile associated with the first participant, including a plurality of first limitations regarding the first participant's interaction with the first process;
    at least one of the application of the first mobile client device and the control device limiting the selective interaction of the first participant with the first process based on the plurality of first limitations;
    a second client device coupled to the at least one communications network, and having an application and a GUI enabling a second participant to selectively interact with the first process through the first control device;
    a second participant profile associated with the second participant, including a plurality of second limitations regarding the second participant's interaction with the first process and the first participant; and
    at least one of the application of the second client device and the control device limiting the selective interaction of the second participant with the first process and the first participant based on the plurality of first limitation and the plurality of second limitations;
    wherein the plurality of second limitations defines the second participant as a supervisor of the first participant's interaction with the first process thereby requiring the second participants consent for the first participant to selectively interact with the first process.

2. The system of claim 1, wherein the at least one communication network includes a wireless communications link.

3. The system of claim 1, wherein:
    the first process sensor elements include an imaging device capable of providing a visual feed of at least a portion of the first process; and
    the application and GUI of at least one of the first and second mobile client device is adapted to display the visual feed for viewing by the respective one of the first and second participant.

4. The system of claim 1, wherein the control device requires authentication of the identity of the first participant before providing the selective interaction with the first process.

5. The system of claim 1, further comprising a first process profile associated with the first process, including a plurality of process limitations, the control system adapted to modify the selective interaction with the first process controller based on the data received from the sensor elements and the plurality of process limitations.

6. The system of claim 1, further comprising:
    a logistics module associated with the control device and adapted to log logistics data;

a logistics profile having a plurality of logistics limitations; and wherein at least one of the application of the first mobile client device and the logistics module are adapted to modify the selective interaction of the participant with the first process controller based on a comparison of the logistics data and the plurality of logistics limitations.

7. The system of claim 1, further comprising:

a third participant;

a transactional module associated with the control device and adapted to log transactional data;

a transactional profile having a plurality of transactional limitations; and wherein at least one of the application of the first mobile client device and the transactional module are adapted to initiate transactions with the third participant based on a comparison of the transactional data and transactional limitations.

8. A system for monitoring and controlling a tangible process and monitoring and authorizing participants associated with the process, comprising:

at least one communication network;

a control device coupled to the at least one communications network and adapted to selectively interact with a first process controller associated with a first process, the first process including process control elements and process sensor elements, the selective interaction including the control device receiving data from the sensor elements and actuating the control elements;

a first client device that is mobile, coupled to the at least one communications network, and having an application and a GUI enabling a first participant to selectively interact with the first process through the first control device;

a first participant profile associated with the first participant, including a plurality of first limitations regarding the first participant's interaction with the first process;

at least one of the application of the first mobile client device and the control device limiting the selective interaction of the first participant with the first process based on the plurality of first limitations;

a second client device coupled to the at least one communications network, and having an application and a GUI enabling a second participant to selectively interact with the first process through the first control device;

a second participant profile associated with the second participant, including a plurality of second limitations regarding the second participant's interaction with the first process and the first participant; and at least one of the application of the second client device and the control device limiting the selective interaction of the second participant with the first process and the first participant based on the plurality of first limitation and the plurality of second limitations;

wherein the plurality of second limitations defines the second participant as a peer of the first participants interaction with the first process thereby requiring mutual consent of the first and second participants for at least some of the first and second participants selective interaction with the first process.

9. The system of claim 8, wherein the at least one communication network includes a wireless communications link.

10. The system of claim 8, wherein:

the first process sensor elements include an imaging device capable of providing a visual feed of at least a portion of the first process; and the application and GUI of at least one of the first and second mobile client device is adapted to display the visual feed for viewing by the respective one of the first and second participant.

11. The system of claim 8, wherein the control device requires authentication of the identity of the first participant before providing the selective interaction with the first process.

12. The system of claim 8, further comprising a first process profile associated with the first process, including a plurality of process limitations, the control system adapted to modify the selective interaction with the first process controller based on the data received from the sensor elements and the plurality of process limitations.

13. The system of claim 8, further comprising:

a logistics module associated with the control device and adapted to log logistics data;

a logistics profile having a plurality of logistics limitations; and wherein at least one of the application of the first mobile client device and the logistics module are adapted to modify the selective interaction of the participant with the first process controller based on a comparison of the logistics data and the plurality of logistics limitations.

14. The system of claim 8, further comprising:

a third participant;

a transactional module associated with the control device and adapted to log transactional data;

a transactional profile having a plurality of transactional limitations; and wherein at least one of the application of the first mobile client device and the transactional module are adapted to initiate transactions with the third participant based on a comparison of the transactional data and transactional limitations.

15. A system for monitoring and controlling a tangible process and monitoring and authorizing participants associated with the process, comprising:

at least one communication network;

a control device coupled to the at least one communications network and adapted to selectively interact with a first process controller associated with a first process, the first process including process control elements and process sensor elements, the selective interaction including the control device receiving data from the sensor elements and actuating the control elements;

a first client device that is mobile, coupled to the at least one communications network, and having an application and a GUI enabling a first participant to selectively interact with the first process through the first control device;

a first participant profile associated with the first participant, including a plurality of first limitations regarding the first participant's interaction with the first process;

at least one of the application of the first mobile client device and the control device limiting the selective interaction of the first participant with the first process based on the plurality of first limitations; and a first process profile associated with the first process, including a plurality of process limitations, the control system adapted to modify the selective interaction with the first process controller based on the data received from the sensor elements and the plurality of process limitations;

wherein the plurality of process limitations includes a predetermined location relative to the first process; and one of the application of the first mobile client device and the control device limiting the selective interaction of the first participant with the first process based on the outcome of a verification of the first participant proximity to the predetermined location.

16. The system of claim 15, wherein the verification is provided by comparing the GPS location of the first mobile client device with the first predetermined location.

17. The system of claim 15, wherein the verification is provided by display of a verification code in the vicinity of the first predetermined location, the transmission of the verification code to the control device using the first mobile client device, and validation of the verification code by the control device.

18. A system for monitoring and controlling a tangible process and monitoring and authorizing participants associated with the process, comprising:
- at least one communication network;
- a control device coupled to the at least one communications network and adapted to selectively interact with a first process controller associated with a first process, the first process including process control elements and process sensor elements, the selective interaction including the control device receiving data from the sensor elements and actuating the control elements;
- a first client device that is mobile, coupled to the at least one communications network, and having an application and a GUI enabling a first participant to selectively interact with the first process through the first control device;
- a first participant profile associated with the first participant, including a plurality of first limitations regarding the first participant's interaction with the first process;
- at least one of the application of the first mobile client device and the control device limiting the selective interaction of the first participant with the first process based on the plurality of first limitations; and
- a first process profile associated with the first process, including a plurality of process limitations, the control system adapted to modify the selective interaction with the first process controller based on the data received from the sensor elements and the plurality of process limitations;
- wherein the process limitations include a preset period of time and the control device includes a lost communication timer adapted to modify the process upon the absence of a predetermined communication from the first mobile client device for greater than a preset period of time.

19. A system for monitoring and controlling a tangible process and monitoring and authorizing participants associated with the process, comprising:
- at least one communication network;
- a control device coupled to the at least one communications network and adapted to selectively interact with a first process controller associated with a first process, the first process including process control elements and process sensor elements, the selective interaction including the control device receiving data from the sensor elements and actuating the control elements;
- a first client device that is mobile, coupled to the at least one communications network, and having an application and a GUI enabling a first participant to selectively interact with the first process through the first control device;
- a first participant profile associated with the first participant, including a plurality of first limitations regarding the first participant's interaction with the first process;
- at least one of the application of the first mobile client device and the control device limiting the selective interaction of the first participant with the first process based on the plurality of first limitations; and
- at least one health sensor associated with the first participant and providing health data to the first mobile client device; and
- wherein the first participant profile includes a heath profile and the plurality of first participant limitations includes a plurality of health limitations; and
- one of the application of the first mobile client device or the control system are adapted to modify the selective interaction of the participant with the first process controller based on a comparison of the health data and the plurality of health limitations.

20. A system for monitoring and controlling a tangible process and monitoring and authorizing participants associated with the process, comprising:
- at least one communication network;
- a control device coupled to the at least one communications network and adapted to selectively interact with a first process controller associated with a first process, the first process including process control elements and process sensor elements, the selective interaction including the control device receiving data from the sensor elements and actuating the control elements;
- a first client device that is mobile, coupled to the at least one communications network, and having an application and a GUI enabling a first participant to selectively interact with the first process through the first control device;
- a first participant profile associated with the first participant, including a plurality of first limitations regarding the first participant's interaction with the first process; and
- at least one of the application of the first mobile client device and the control device limiting the selective interaction of the first participant with the first process based on the plurality of first limitations;
- at least one environmental sensor providing environmental data to at least one of the first mobile client device and the control device; and
- wherein at least one of the first participant profile and a first process profile includes an environmental profile having a plurality of environmental limitations; and
- one of the application of the first mobile client device or the control system are adapted to modify the selective interaction of the participant with the first process controller based on a comparison of the environmental data and the plurality of environmental limitations.

21. A system for monitoring and controlling a tangible process and monitoring and authorizing participants associated with the process, comprising:
- at least one communication network;
- a control device coupled to the at least one communications network and adapted to selectively interact with a first process controller associated with a first process, the first process including process control elements and process sensor elements, the selective interaction including the control device receiving data from the sensor elements and actuating the control elements;
- a first client device that is mobile, coupled to the at least one communications network, and having an application and a GUI enabling a first participant to selectively interact with the first process through the first control device;
- a first participant profile associated with the first participant, including a plurality of first limitations regarding the first participant's interaction with the first process;
- at least one of the application of the first mobile client device and the control device limiting the selective interaction of the first participant with the first process based on the plurality of first limitations;

a regulatory participant;

a regulatory module associated with the control device and adapted to log regulatory data; and a regulatory profile having a plurality of regulatory limitations; and wherein at least one of the application of the first mobile client device and the regulatory module are adapted to modify the selective interaction of the participant with the first process controller based on a comparison of the regulatory data and the plurality of regulatory limitations.

* * * * *